(12) United States Patent
Buldas et al.

(10) Patent No.: US 12,093,952 B2
(45) Date of Patent: Sep. 17, 2024

(54) VERIFIABLE TRANSFER OF DATA USING SHARDED BLOCKCHAIN

(71) Applicant: Guardtime SA, Lausanne (CH)

(72) Inventors: Ahto Buldas, Tallinn (EE); Mart Saarepera, Tallinn (EE); Michael Gault, Rovaniemi (FI); Risto Laanoja, Tallinn (EE)

(73) Assignee: Guardtime SA, Lausanne (CH)

( * ) Notice: Subject to any disclaimer, the term of this patent is extended or adjusted under 35 U.S.C. 154(b) by 328 days.

(21) Appl. No.: 17/395,633

(22) Filed: Aug. 6, 2021

(65) Prior Publication Data

US 2021/0365943 A1 Nov. 25, 2021

Related U.S. Application Data

(63) Continuation-in-part of application No. 17/194,303, filed on Mar. 7, 2021.

(60) Provisional application No. 63/062,055, filed on Aug. 6, 2020, provisional application No. 62/986,530, filed on Mar. 6, 2020.

(51) Int. Cl.
*G06Q 20/40* (2012.01)
*G06Q 20/38* (2012.01)
*H04L 9/32* (2006.01)

(52) U.S. Cl.
CPC ....... *G06Q 20/401* (2013.01); *G06Q 20/3825* (2013.01); *H04L 9/3239* (2013.01); *H04L 9/3247* (2013.01); *G06Q 2220/00* (2013.01); *H04L 2209/56* (2013.01)

(58) Field of Classification Search
CPC ............ G06Q 20/401; G06Q 20/3825; G06Q 2220/00; H04L 9/3239; H04L 9/3247
USPC .......................................................... 705/75
See application file for complete search history.

(56) References Cited

U.S. PATENT DOCUMENTS

| | | | |
|---|---|---|---|
| 11,526,875 B1 * | 12/2022 | Shetti ................. | G06Q 20/3678 |
| 2019/0220621 A1 * | 7/2019 | Chan ...................... | G06F 21/606 |
| 2020/0151682 A1 * | 5/2020 | Hurry ................ | G06Q 20/0655 |
| 2020/0327545 A1 * | 10/2020 | Xie ....................... | G06Q 20/223 |
| 2021/0256487 A1 * | 8/2021 | Johnson ............. | G06Q 30/0601 |

\* cited by examiner

*Primary Examiner* — Courtney P Jones
(74) *Attorney, Agent, or Firm* — Jeffrey Pearce

(57) ABSTRACT

Exclusive ownership of data units, such as monetary units, is transferred by inputting a request from a transferor, to transfer to a transferee at least a designated one of the data units, said request including an identifier of the transferor, an identifier of the designated data unit, and an identifier of a transferee. The identifier of the transferor is verified and the absence of any other request to transfer the designated data unit is confirmed. A designation of ownership of the designated data unit is then changed from the transferor to the transferee in a ledger, which is comprised of a group of subledgers, each configured as a blockchain.

8 Claims, 12 Drawing Sheets

VERIFIABLE TRANSFER OF DATA USING SHARDED BLOCKCHAIN

CROSS REFERENCE TO RELATED APPLICATIONS

This application is a continuation-in-part of and claims priority of U.S. patent application Ser. No. 17/194,303, filed 7 Mar. 2021, and also claims priority of U.S. Provisional Patent Application No. 63/062,055, filed 6 Aug. 2020, as well as of U.S. Provisional Patent Application No. 62/986,530, filed 6 Mar. 2020, of which U.S. patent application Ser. No. 17/194,303 also claims priority.

TECHNICAL FIELD

This invention relates to data security.

BACKGROUND

Data is everywhere nowadays, and few people in industrialized countries are not involved in some form of data transfer almost every day. Email, online purchases, bank transfers, online entertainment and news, requests for all manner of services, text messaging and even voice calls over digital networks, etc., are just a few of the seemingly countless instances of data transfer. In many cases, transfer involves some form of reproduction: Text written using one computing device (computer, smart phone, etc.) is passed in digitized form to another computing device for reproduction as an email or text message; data defining a copy of a document, or an address or reference such as a link to a web site, database entry, account, etc., is passed from one person to another; security keys are exchanged; etc. In these situations, more than one instance of some data set may, or even should, exist in more than one location at the same time, or, logically identically, more than one entity may have the ability to pass on to others the ability to hold, access, or otherwise control the data set.

In some other situations, however, only one entity at a time should be able to control further transfer of any instance of or reference to, or control over a data set. Examples of such "single valid instance" data sets include some permissions, highly secret documents, digital cash, etc.

One obvious problem when it comes to these situations is that there must exist some way to prove that an instance of digital information is indeed the only valid one, since, unlike physical objects, data is easy to perfectly copy. This applies as well to data sets that define permissions related to objects or digital information. One way to do this is to create a ledger that keeps track of the current authorized "owner" of the single-instance data set. This then moves the "problem" to being able to prove that the ledger itself is correct and has not been tampered with.

One form of ledger that has been proposed to solve this problem is a "blockchain", which, in its simplest form, is sequence of data "blocks" such that each block is cryptographically linked to at least one previous block so as to make any change to previously entered blocks detectable. In some cases, the blockchain forms a ledger that is distributed among several parties. Perhaps the most well-known current example of the such a distributed ledger based on a blockchain is Bitcoin.

One drawback of existing blockchain-backed ledger systems is lack of scalability. Distributed ledger technologies (DLT) such as Bitcoin by their nature require an entire blockchain to be held and managed by several disparate systems, which must then coordinate using some kind of consensus mechanism so that they all can agree on what the correct current state of the blockchain is. Moreover, permissionless DLT systems require some way to determine which entity is allowed to add to the blockchain. This leads to mechanisms such as proof-of-work, proof-of-stake, proof-of-space, etc., which introduce delay in addition to complexity. The Bitcoin system, for example, is designed not to update more frequently than about every ten minutes. Such a delay is unacceptable for many use cases where a potentially large number of data transfers need to be secured quickly. This drawback exists to varying degrees in most other blockchain solutions as well, such as Ethereum.

The problem of lack of scalability arises in almost every system that relies on a global ledger that tracks the status of every transferrable data set in the system. In systems that involve a large number of transactions per time unit, bandwidth alone is often a limiting factor, and if access to the single ledger is cut off, for example due to a simple server failure, then the whole system must often halt. One way to reduce the bandwidth demand on a single ledger host, and to increase guaranteed accessibility, is to distribute the ledger. This then causes a need to ensure that all copies of the ledger are synchronized and correct.

Bitcoin introduced a new monetary unit—Unspent Transaction Outputs (UTXOs)—now used by many cryptocurrencies. UTXOs can only be spent once, but in doing so, new UTXOs are created and can have different values and owners. In such a Bitcoin transaction, one or more UTXOs having a certain total value are destroyed (spent), and new UTXOs with potentially different values and owners are created.

In the context of electronic financial transactions, a commonly used arrangement is for users to have accounts, in which transactions involve changes of balances. Such account-based transaction systems also suffer from a lack of scalability since almost every transaction must be processed through at least one centralized or even multi-party clearance system. Yet another drawback of existing account-based systems arises when a central authority such as a country's central bank wishes to emit new currency units. If the currency units are intended to be individualized, such as through serial numbers, then this individualization is usually lost when account balances are changed, since accounts generally are defined by single-value balances.

Analogous problems arise in other contexts in which it is not the uniqueness of individual data sets that needs to be ensured upon transfer. One such situation is where the holder of a number of items wishes to transfer proof of ownership of some of these to a recipient in such a way that the recipient can be sure that the holder/sender didn't also commit those same items to yet another recipient.

DESCRIPTION OF EMBODIMENTS

Figure 1:
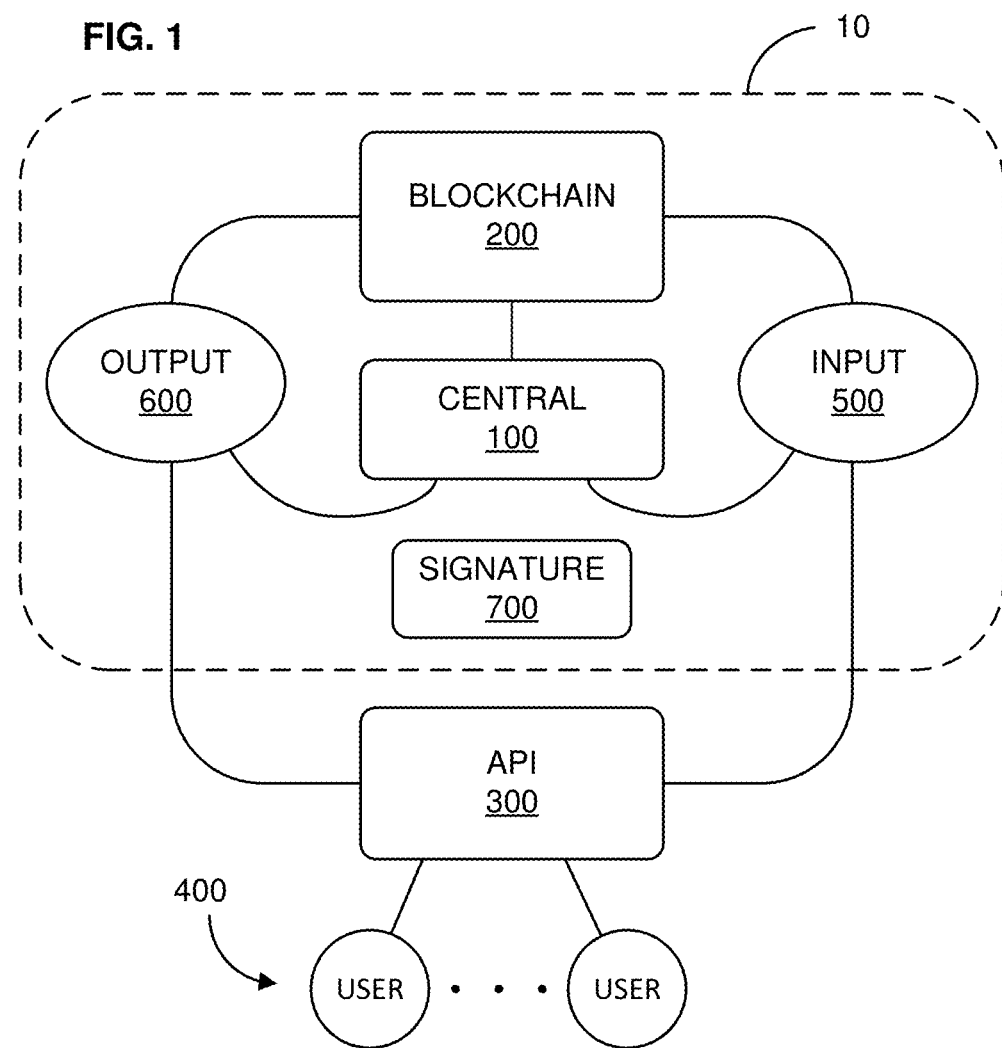
FIG. 1 depicts the main functional components of embodiments of the invention.

Embodiments disclosed here are based on a novel decomposed ("sharded"), stateless blockchain arrangement, and have different aspects that may be used in different contexts. Some embodiments, for example, enable verifiable transfer of ownership of any type of data unit, such that only one entity at a time should be allowed to control of the data unit. In some implementations, data units themselves need not be transferred, but rather only information uniquely identifying the data unit involved in a transfer request, as well as information about the transferor and transferee. In some such embodiments, the data unit may be considered a kind of abstraction, in that no actual data set needs to pass uniquely from one entity to another. In other embodiments, the data unit itself may contain the data structures used to establish exclusive ownership of it. Yet another embodiment is also disclosed below that is directed to ensuring the verifiable and unique transfer of some part of a whole, instead of units, from a sender to a recipient.

Here, a transferrable set of data may be viewed as a data "unit", even if it comprises more than one parameter, in that it is some body of information in digital form that is to be associated with only one entity at a time. Some examples of such data units are given above; others include digital titles to land or other property; digital versions of negotiable bearer instruments; access codes; copies of audio and/or video files that only one party at a time is authorized to control (such as in a Digital Rights Management framework), etc.

Ownership of a data unit may be purely logical, that it, without a requirement for any data file or the like to be moved from the system of a current owner to the system of a subsequent owner. Consequently, reference here to transferring a data unit, such as a bill, is to be interpreted not as a requirement to move a data set from one system to another (although this would be possible, for example, in conjunction with a verified change of ownership of the data set), but rather that ownership of the respective data unit is changed from a transferor to a transferee. This is common even in other contexts as well. For example, some exclusive ownership rights may be changed in some jurisdictions simply by having the current owner, or its properly authorized representative, after proper verification of identity, upload to a governmental authority a proper request to record the change. Some mechanism is then usually provided to allow the new owner to verify the transfer went through.

The concept of "bill" should therefore be considered as also comprising some digital information or data structure state that identifies the entity that has the exclusive ability to request a change of control of ownership of the right represented by the bill. In the case of money, that "right" is the ability to control ownership of a concept of value that has been established by the emitting entity and is accepted by a transferee.

Merely by way of example, and because the terminology for payments is generally well-understood, some embodiments are described below in the context of digital cash. This example also has the advantage of including some qualitative concepts such as "denomination" or "value" that may not be present in other contexts. This is, however, just one possible use case and the concepts may be applied in other cases as well with modifications—if needed at all—that skilled programmers will be able to implement.

Embodiments for Transfer of Units

Assume, again by way of example only, that the type of data set one wishes to be able to transfer the ownership right to defines a unit of digital currency—a "digital bill", or simply "bill". Such a digital bill may be viewed as a data set or abstraction that has at least the attributes of 1) fixed nominal value and 2) a unique identifier such as a serial number.

As used here, the term "emitted money" is a number e that represents the total amount of money in current circulation, that is, the sum of the nominal values of all bills. Bills are "emitted" by an "emission process". In the physical world, bills (or other documents) are typically "emitted" by being printed or minted, preferably in some difficult-to-counterfeit way, and then put into circulation through some predefined process. Below is described a method to emit digital bills.

After emission, some entity will be the authorized holder of a digital bill, that is, the "rights holder", who/which may be termed an "owner" or "bearer" depending on the context and implementation. Without loss of generality, the terms "owner" and "bearer" are used here to designate the entity that currently holds the right to request a transfer of that right to another entity (or to himself, such as from one corporate entity to another commonly owned corporate entity, from an individual to himself, such as between accounts, etc.). The holding of rights to a digital bill may be represented or viewed as a data structure with at least the attributes: 1) an identifier $ID_U$ of the data unit, that is, the digital bill itself, and 2) an identifier $ID_{OR}$ of the transferor, that is, current owner. As for owner identity, note that some embodiments of this invention make it possible, although not necessary, to maintain the anonymity of actual parties to transactions even during the transfer process. This is consistent with the concept of "cash": If Alice gives a $10 or €10 note to Bob, no other person or authority will typically know either's identity.

It is not required by any embodiment of this invention for a rights holder to be an individual human; rather, any identifiable entity may be an owner, etc., including individuals and groups, both physical and legal persons, and even software processes that are able to perform the actions described below to either initiate a transfer, receive ownership of a transferred data set, or both.

Assume by way of example that ownership rights to bills are to be transferred from one entity to another. In the context of the example of digital cash, this transfer might be a payment for something, a transfer for the purpose of deposit in some other data structure, etc. In general, all transfers of digital cash are a form of "payment", which means simply the process of changing the designation of the bearer of a digital bill. Payment is initiated by a payment order, which is represented by a digital data structure with at least the following attributes: 1) the digital bill to be transferred, 2) an identifier of the payer, who is the current bearer/transferor; and 3) an identifier of the payee/transferee, that is, the recipient, who is to be made the new bearer.

When designing a solution for transferring a data set, that is, a digital asset such as, for example, digital cash, some key considerations are:

What entity declares, that is, defines, what the data set, such as a bill, is?
What entity creates and makes available ("emits") the transferrable data set, such as a bill?
What entity declares who owns (controls right to) a bill?
What entity changes the owner, that is, who processes the payments?

The answers to these questions contain the following security concerns:

What secures a bill, and how? What makes it falsification-proof?
How is the emission process controlled and secured?
What secures the ownership, and how?
What guarantees and secures the payments, and how?

In case of physical cash, for example, money is defined by a central bank and is provided with security elements that enable high security. The central bank controls the emission process, so it may be made highly secure. The bearer is simply declared to be the physical bearer and the bearer is changed directly by the payer and payee: If Alice hands a €20 note to Bob, the transfer of ownership is complete and Bob is the new bearer.

Summary of Three Types of Prior Art Solutions

To illustrate some aspects and shortcomings (in particular, technical bottlenecks and lack of scalability) of existing methods for ensuring verifiable and unique transfer, consider some existing models of digital money: bank money in two different settings, and Bitcoin. These models are 1) a trusted server solution that assumes a trusted processor that has full control over the data and isn't audited/verified by external parties, 2) a modified solution in which data structures are augmented with cryptographic certificates that make the system externally auditable/verifiable, and 3) the Bitcoin system, which is similar to the second case, except that the emitting party is eliminated and replaced by a fixed emission rule, and the notion of ownership is slightly different.

In a trusted server solution:
A bill is an entry in a database
Bills are emitted by a bank
The bank defines the bearer: the bearer is the account holder, authenticated by the bank
The bearer is changed by the bank based on payment orders of account owners The bill is in this case a number in a bank account and may have any nominal value between 0 to e. Payment processing in this known solution means that the bills of the payer and payee are destroyed and new bills are emitted. The security of a bill and its ownership are based on full trust in the server, although the security of payment can be improved by server authentication, account holder authentication, and digitally signed payment orders.

One way to improve security is by replacing the trusted server with a certified ledger. This then creates a trust-free server solution, typically based on a blockchain. In this solution, the data that is processed by the bank (accounts and balances) is made public and secured by a certificate. Payment orders are recorded in a ledger and put into public domain. For privacy reasons, accounts may be anonymized.

In order to verify a bill, one needs a full ledger in order to verify that e does in fact equal the sum of the values of all emitted bills. One problem with this solution is that the resources needed for verifying a bill do not scale.

Bitcoin-type solutions rely on a permissionless blockchain. In this solution:
A bill is an entry in a ledger
Bills are emitted according to ledger rules
The bearer is defined by ledger rules: the bearer id is decided by the payer, not assigned by the system.
The bearer is changed according to ledger rules
Nominal values of bills range from 1 to e and the number of owners ranges from 1 to the number of bills. As in the previous case, verification of a bill requires the full ledger, and the verification process does not scale efficiently.

In all three of the solutions just summarized, in case of fixed e, not only the number but also the nominal value of bills in use varies. In part, because of this, the verification of neither the bills nor their ownership is scalable.

Hash Functions

Hashing of data is a well-known procedure and is used often in embodiments of this invention. In general, a cryptographic hash function h converts binary data X of arbitrary size to a bitstring (called the "hash value" or just "hash") $x=h(X)$ of fixed size, typically 256 or 512 bits. Cryptographic hash functions are assumed to be "collision resistant", which means it must be computationally infeasible to find a second, different binary input X' that has the same hash value as the first, X. The SHA class of hash functions is just one common choice that may be used in embodiments here, but no embodiment depends on this choice. Another advantage of hash functions is that they are in general efficient to compute: even standard hash functions like SHA-2 or SHA-3, for example, enable about a million hash operations per second on an ordinary desktop computer with only one processor core.

Blockchain

Although the term "blockchain" itself, as well as related terms, do not yet have universally accepted definitions, typically a "blockchain" is understood as being a data structure comprising a series of usually cryptographically linked, where each block includes data corresponding to one or more transactions, hashed together with linking data, such as the hash of some data and/or metadata of at least one preceding block. The blockchain can then be used to create a ledger, which is typically an append-only database.

Some blockchain variants involve distribution and consensus, that is, copies of the entire blockchain are distributed to several entities, which then follow a procedure to come to some pre-defined notion of "consensus" as to what data is to be allowed to constitute the next block. Many of the blockchains used for cryptocurrencies follow this "permissionless" model, for example, since they, usually by design philosophy, wish to avoid any central authority.

In other "permissioned" configurations, at least one controlling entity may control access to a proprietary blockchain according to its own rules; governments, banks, enterprises, etc., will, for example, usually not want the operation of their blockchains to depend on consensus among distributed, often anonymous outside entities. In either case, once data is entered into a block of the chain, the entry is essentially irrefutable, that is, non-repudiable, since any tampering with the data would be reflected in the chained hash calculations and thus easily detected.

Witness

Below is described how cryptographic proofs are obtained to enable verification of the state of various data structures and operations. Such a proof is generally referred to in the field of cryptography as a "witness" or a "certificate". One example of such a witness is a digital signature, which is the example used below in discussions of embodiments and aspects of the invention. Except where a specific signature mechanism is referenced, the term "digital signature" should therefore be read as including any form of witness or certificate that can perform the same function of cryptographically verifying a given data state.

One example of an alternative to digital signatures is the structure known as an "authenticated dictionary". Using such a structure, one obtains a certificate for a state input by submitting a representation of the state input to the (potentially distributed) authenticated dictionary, in which the certificate comprises cryptographic information proving the participation of the state input, and returning an authenticator value as a trust reference. A later purportedly authentic representation of the state input may then be verified as being valid if cryptographic verification of the purported state input, the respective certificate, and the authenticator, succeeds.

Digital signatures are used in some steps of the embodiments described below as the witness. Embodiments of this invention do not require any specific form of signature service or witness, and the system designer may choose any system that satisfies the security requirements of the particular implementation. An advantageous service and digital signature, however, are provided by the data signature infrastructure developed and marketed under the name "KSI®" by Guardtime AS of Tallinn, Estonia. This system is described in general in U.S. Pat. No. 8,719,576 (also Buldas, et al., "Document verification with distributed calendar infrastructure"). In summary, for each of a sequence of accumulation rounds, also known as calendar periods (typically related one-to-one with physical time units, such as one second), the Guardtime infrastructure takes digital input records as inputs, that is, lowest-level tree "leaves". These are then cryptographically hashed together in an iterative, preferably (but not necessarily) binary hash tree, ultimately yielding an uppermost root hash value (a "calendar value") that encodes information in all the input records. This uppermost hash value is then entered into a "calendar", which is structured as a form of a type of blockchain which, in some implementations, may involve aggregating calendar values into a progressive hash tree. The KSI system then returns a signature in the form of a vector, including, among other data, the values of sibling nodes in the hash tree that enable recomputation of the respective calendar value if a purported copy of the corresponding original input record is in fact identical to the original input record.

Note that no signature is returned to any input entity until all inputs have been received for a given calendar period. This is because, until all inputs are received, it is not possible to compute the root value. One consequence of this is that, once a signature has been returned for an input, it is too late to attempt to get another signature for the same (or any other) input value in the same calendar period.

Although the KSI infrastructure can thus function as a synchronization mechanism at the same time as providing digital signatures, it would also be possible to synchronize transaction commitments using any other chosen timing or time-stamping mechanism; moreover, other signature mechanisms may be chosen to form the basis of the various proofs described below. An accumulation cut-off and/or time synchronization mechanism such as the KSI infrastructure (as one example) provides is used in embodiments to prevent so-called "double spending", that is, more than one transfer of the same data set to different recipients.

As long as it is formatted according to specification, almost any set of data, including concatenations or other combinations of multiple input parameters, may be submitted as the digital input records, which do not even have to comprise the same parameters. One advantage of the KSI system is that each calendar block, and thus each signature generated in the respective calendar time period, has an irrefutable relationship to the time when the block was created. In other words, a KSI signature also acts as an irrefutable timestamp, since the signature itself encodes time to within the precision of the calendar period.

Yet another advantage of the Guardtime infrastructure is that the digital input records that are submitted to the infrastructure for signature/timestamping do not need to be the "raw" data; rather, in most implementations, the raw data is optionally combined with any other desired input information (such as user ID, system information, various metadata, etc.) and then hashed. Given the nature of cryptographic hash functions, what gets input into the KSI system, and thus ultimately into the calendar blockchain, cannot be reconstructed from the hash, or from what is entered into the calendar blockchain.

Scalable Blockchains

An example of a trust-free solution is blockchain-based. One of the main concerns related to today's blockchain solutions is, however, their poor scalability. For convenience and to help understand the novel embodiments of this invention, the general theory of scalable blockchain solutions is outlined; fault- and attack-tolerant implementations of blockchains are also discussed.

General Description of Main Components

A general view of the main components in some embodiments is depicted in FIG. 1: A service infrastructure 10, which reference number also refers collectively below to the various processes it carries out, includes a central controlling entity 100, which communicates with a blockchain "machine" 200. Users (referenced collectively as 400), via any conventional device such as a smart phone, tablet, personal computer, terminal, etc., interact with the service infrastructure 10 via an application program interface 300, which communicates with an input component 500 and an output component 600. The input and output components 500, 600 also communicate with both the central controlling entity 100 and the blockchain machine 200. The components 500, 600 may be implemented as respective data structures with executable code to perform the functions described below, with or without a separate processing entity, which may but need not be part of a larger one. The components 500, 600 may be configured as gateway-associated buffer databases and may also function as respective helper firewall (or other security mechanism) layers that may also provide search and access control, and also provide an API to end users.

Although the components 100, 200, 500, and 600 are illustrated as being separate systems, which will be a common choice in practical implementations, in some cases it may be possible to implement two or more of these components on a common hardware and/or software platform. Conversely, as will be understood from the description below, some of the components depicted in FIG. 1 may comprise more than one computing platform—in embodiments, for example, "the" blockchain is sharded, different shards residing on and being processed by different computing platforms.

In FIG. 1, a signature system 700 is also shown as being part of the overall service 10, which is one option. The signature system 700 (for example, the KSI system) may instead be an external service that the components of the service 10 or any other entities may communicate with using other conventional methods in order to obtain digital signatures. Depending on the signature method chosen, as needed, these entities may also communicate with the signature system in other to verify signatures, which may be used in proofs of validity and integrity of various data structures and data described below.

Figure 2:
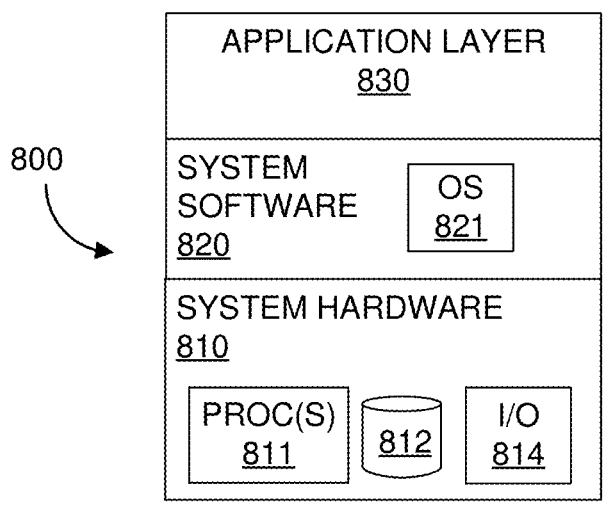
FIG. 2 illustrates the components of a typical hardware/software platform.

The routines, processes, storage functions, etc., described below must of course be performed by actual hardware and software platforms, even if any of these are done remotely, such as by using cloud computing, or in virtual machines, etc. FIG. 2 illustrates the main hardware and software components of one example of the type of computing system, that is, "platform" 800, that may be used to carry out the respective processes involved in embodiments of the invention.

Each platform will include standard components such as system hardware 810 with at least one processor 811, volatile and/or non-volatile memory and/or storage, indicated "collectively" as component 812, and standard I/O access components 814 to enable communication with other entities and systems over any known type of network, wireless or wired. The processor-executable code organized as software modules used to carry out the various computations, routines, and functions described below may be stored and thus embodied in either or both types of memory/storage components 812. The software modules will thus comprise processor-executable code that, when run by the processor(s) 811, cause the processor(s) to carry out the corresponding functions. Some form of system software 820 will also be included, such as an operating system 821 and/or virtual machine hypervisor.

Platforms will also include an application layer 830, which comprises various software components/modules for performing the functions described below. Although some entities may run on a single hardware/software platform, such as is shown in FIG. 1 for the central control entity 100, this is not a requirement; rather, some entities may operate using hardware and software resources that reside and run on more than one physical and/or virtual platform. As is explained below, this is particularly the case with the blockchain machine 200, which will typically (but not necessarily) comprise a different virtual and/or physical platform for each gateway that maintains or inputs a bill ledger and even "a" gateway may be comprised of a cluster of separate platforms.

The service infrastructure-process 10 will typically update blockchain data structure based on some additional input, say, x. For example, as described below in the case of a digital cash implementation of embodiments of this invention, x contains emission orders and payment orders. The service may also optionally implement a public rule-based process for computing a new version of the blockchain, for example, based on the previous version and the additional input x. An example of such a rule might that, for a given data set (such as cash "bill"), only one change may be made during some period, for example, the period during which signatures are formed; in implementations that use the Guardtime KSI system for signatures, this period may be typically be the "calendar period" or, more generally, the period during which inputs are aggregated to form a hash tree root value from which signatures are generated as hash chains. These concepts are described in more detail below.

The blockchain data structure used in some embodiments does not need to depend on the central controlling component 100 having a trusted long-term memory of all transactions; rather, in those embodiments, all necessary data for the service may be stored in the input and output components, with the blockchain mechanism itself being stored in the component 200 (which, as is described below, comprises shards).

Cryptographically Verifiable Data

All data in the blockchain should preferably be reliably verifiable without using any assumptions about the physical host machines. This may be achieved by using cryptographically v erifiable data, that is, the blockchain itself and the additional input x contain cryptographic certificates that protect their integrity. The verification of input and output data may thus depend on the service rules and cryptographic certificates. There should therefore be an efficient verification process.

Mathematically, the blockchain may be defined by two functions:

Verification function V that on input of a blockchain B, returns $V(B) \in [TRUE, FALSE]$.

Update function U that on input of a blockchain B' (current version) and an additional input x, returns a new blockchain $B=U(B', x)$.

Both V and U may depend on parameters, such as public and private cryptographic keys.

The system may set $U(B', x)=B'$, if x is invalid. In other words, if the input value x is in any way improper, then the blockchain is not changed according to x.

System Scalability

Figure 3:
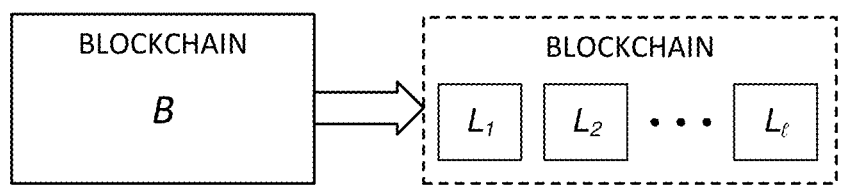
FIG. 3 illustrates decomposition of a blockchain into sub-ledgers.

As mentioned above, a common problem with existing solutions is a lack of scalability: As the number of transfers ("transactions") increases, either the system cannot keep up in time, or the size of the ledger that many different entities must agree upon, update, and store becomes impractical. In embodiments of this invention, this problem is addressed in part by decomposing the ledger/blockchain, that is, it implements a partitioning rule (see FIG. 3) such that the whole blockchain/ledger B decomposes into sub-ledgers $L_1$, $L_2$, ..., $L\ell$ so that a transfer involves one particular part $L_i$ of the ledger, not always the whole blockchain B. Mathematically, one may represent this decomposition as a function D such that $D(B)=(L_1, L_2, \ldots, L_\ell)$ and a composition function C such that $C(L_1, L_2, \ldots, L_\ell)=B$, that is, $C(D(B))=B$ for any possible instance of the blockchain. In this case, one may use the notation:

$$B \cong (L_1, L_2, \ldots, L_\ell)$$

For full-fledged scalability of the system both the verification of the ledger and the production of the ledger by the service should be scalable.

Verification Scalability

Figure 4:
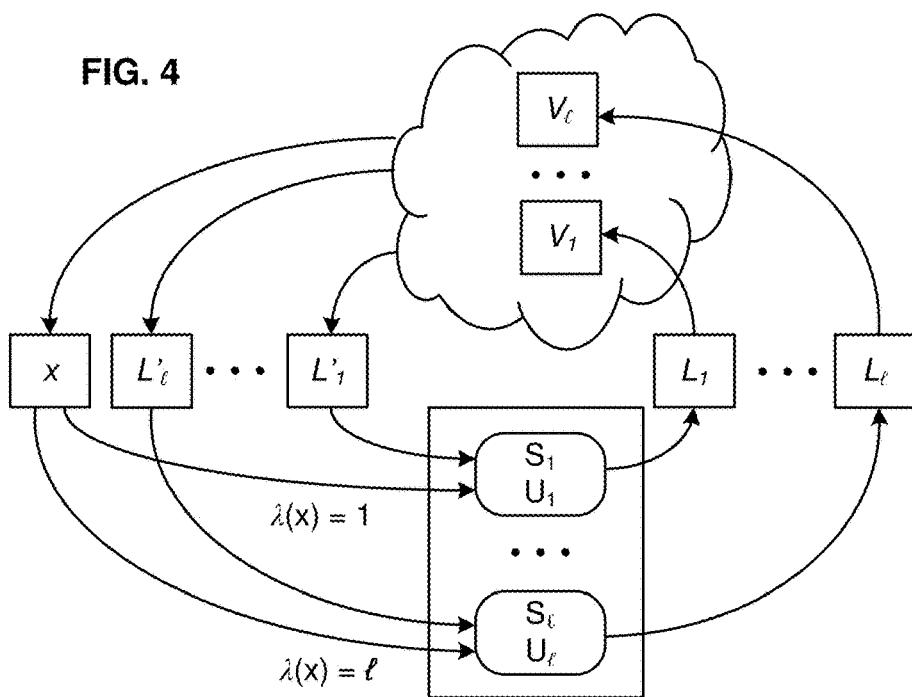
FIG. 4 illustrates a blockchain with a scalable service.

In a blockchain with scalable verification (see FIG. 4), several instances of a verification process may be applied to different sub-ledgers L, so that for the verification of one sub-ledger no data from other sub-ledgers is needed. Mathematically, this means that the verification predicate V is a Boolean conjunction:

$$V(B)=V_1(L_1) \wedge V_2(L_2) \wedge \ldots \wedge V\ell(L\ell),$$

where $V_1$, $V_2$, and $V\ell(L\ell)$, are predicates.

Service Scalability

Figure 5:
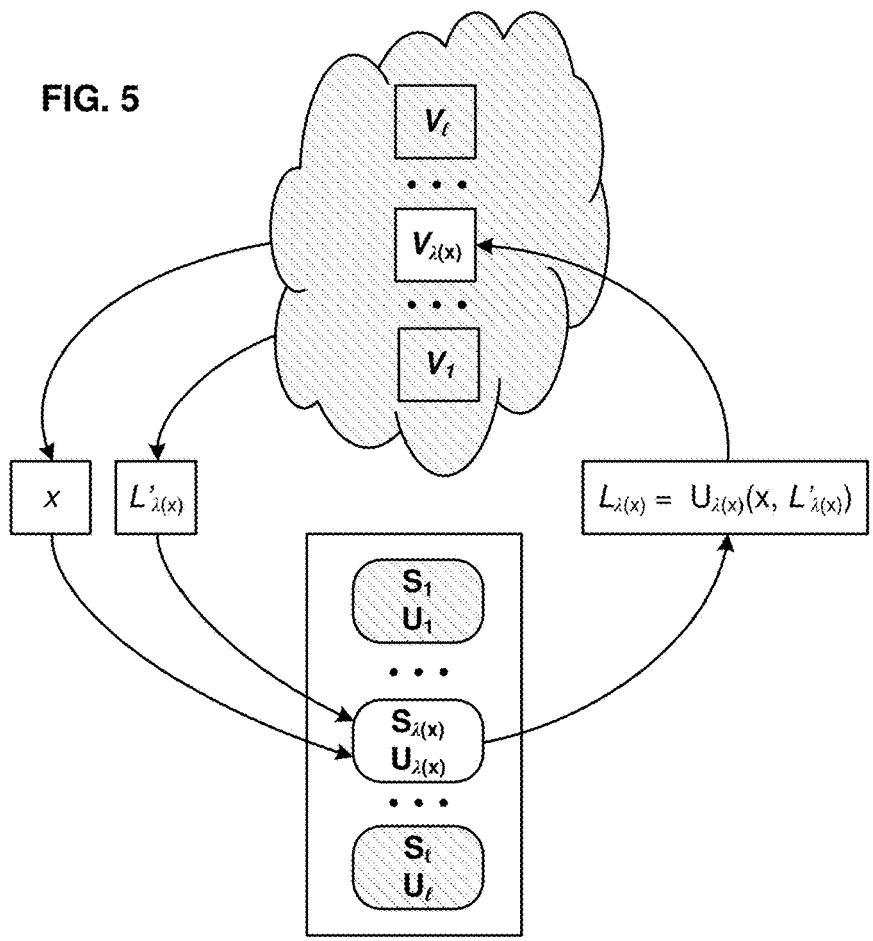
FIG. 5 illustrates request processing in a scalable blockchain system.
Figure 6:
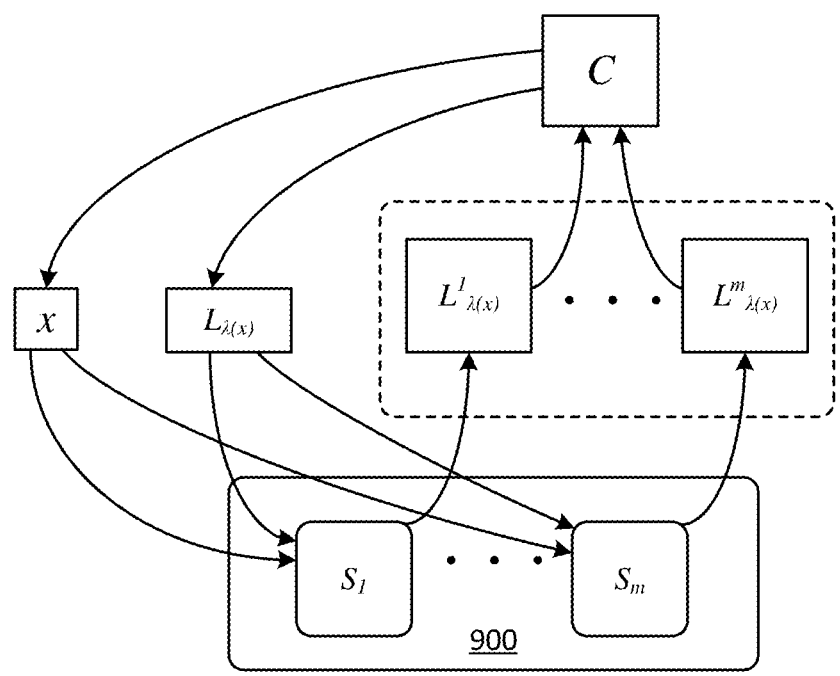
FIG. 6 illustrates a fault- and attack-tolerant implementation of a service.

Every physical server has limited processing speed, memory and network connectivity. In order to make the production of the blockchain scalable, embodiments of this invention decompose the service process into multiple processes $S_1, \ldots, S_m$ (see FIG. 5). In a blockchain with such a scalable service (FIG. 6), each component server S produces only a part of the blockchain (that is, a limited set of subledgers L) using as input only a part of the blockchain and only a subset of additional inputs x. Mathematically, this means that there are partial update procedures $U_1$, $U_2, \ldots, U\ell$ such that if $B' \cong L'_1, L'_2, \ldots, L'\ell$, then for every input x:

$$U(B',x) \cong (U_1(L'_1,x), \ldots, U\ell(L'\ell,x)),$$

As mentioned above, in embodiments of this invention, the blockchain, which encodes the state of all emitted bills, is sharded, such that, instead of a single global ledger that all system actors must store, there are subledgers that, together, include the information for bills.

Here, by "sharding" is meant a function $\lambda$ that for every additional input x, returns an index $\lambda(x) \in [1, \ldots, \ell]$ such that for every index i, except $i = \lambda(x)$, we have $U(L'_i, x) = L'_i$. In other words, each input x influences only one subledger $L_{\lambda(x)}$. In practice, this means that, given an additional input x, before sending it to the service, the system computes $i \leftarrow \lambda(x)$, and sends x only to the component $S_i$ of the service, because other components would have no reaction to x anyway. The practical implication of this is explained below but can be summarized here: each given bill that has been emitted is associated with one of the ledger shards, that is, sub-ledgers.

Such a decomposition, according to embodiments of this invention, can guarantee limited memory, processing, and communication requirements for the component servers, which, consequently, enables far superior scalability relative to prior art solutions that use a single, distributed global ledger.

Figure 7:
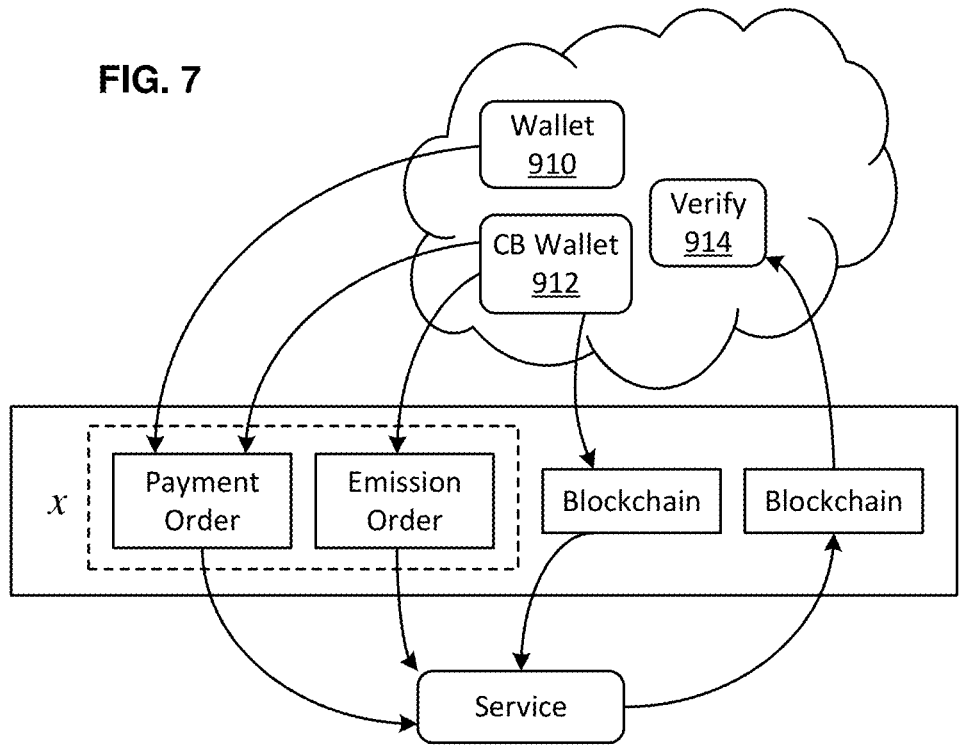
FIG. 7 illustrates a blockchain model for processing data units such as digital cash.

The general logic of data processing in a scalable blockchain system according to embodiments of this invention is depicted in FIG. 7. Given an additional input (request) x, the associated service component is found via applying the sharding function $\lambda$ to the additional input. The request is then processed by the service component $S_{\lambda(x)}$ by applying the update function $U_{\lambda(x)}$ to the additional input x and the subledger $L'_{\lambda(x)}$ and the new subledger is computed:

$$L_{\lambda(x)} = U_{\lambda(x)}(x, L'_{\lambda(x)})$$

The newly computed subledger can be verified by applying the component $V_{\lambda(x)}$ of the verification function.

Fault- and Attack-Tolerant Implementation of the Service

To eliminate or reduce trust requirements of the service, the implementation of the service is preferably made fault tolerant; for example, it should preferably guarantee that every correct and consistent transfer/payment order will eventually be processed by the service and ledger changed accordingly. To solve this problem, a redundant design may be implemented in which the service is provided in parallel with a cluster (900, FIG. 6) of physical servers. For each received transfer request, the different servers, operating according to any known fault tolerance mechanism (such as consensus), will produce the same sub-ledger. In short, each ledger shard may be handled in parallel, redundantly, by a cluster of servers acting as "the" server responsible for bills assigned to the respective shard. Reference to "a" gateway or transfer-processing server should therefore also be read as optionally referring to a cooperating group of physical servers.

One multi-party communication protocol that may be used to provide fault tolerance may be any of the class consensus mechanisms that provide Byzantine fault tolerance (BFT) for the detection and correction of Byzantine faults. A "Byzantine fault" of a physical server means here any form of misbehavior of a server, including all kinds of sneaky adversarial behavior; this is a known definition. Byzantine fault tolerance thus implies attack tolerance.

There are known multi-party protocols developed for achieving fault tolerance for a limited set of Byzantine faults (limited number of faulty-nodes, etc.). These protocols are known to be very efficient for a relatively small numbers of physical servers. In the context of implementations of embodiments of this invention that use server clusters, the properties that the designer-chosen protocol should have include:

The additional input x is sent to all physical servers $S_1, \ldots, S_m$ of the cluster. The servers may then use a gossip mechanism (a known concept, involving inter-server communication) such that if x reaches at least one non-faulty server, it reaches all non-faulty servers, or at least a predetermined minimum number of them.

Every physical server has a copy of the corresponding component ledger $L'_{\lambda(x)}$ All physical servers $S_1, \ldots, S_m$ independently compute and output, respectively, the variants of the next versions $L^1_{\lambda(x)}, \ldots, L^m_{\lambda(x)}$ of the ledger.

Any entity that uses the output of the server cluster collects all or at least some architected minimum number of the outputs of the list $L^1_{\lambda(x)}, \ldots, L^m_{\lambda(x)}$ that are available.

There is a consensus function C that, given as input the list $L^1_{\lambda(x)}, \ldots, L^m_{\lambda(x)}$ of next versions of the ledger, outputs the consensus value $L_{\lambda(x)} \leftarrow C(L^1_{\lambda(x)}, \ldots, L^m_{\lambda(x)})$ of the ledger, or an indication $\perp$ (no valid result) if there is no consensus. For example, the function C may be defined in a way that $L_{\lambda(x)}$ equals to the common value of a subset of $T>m/2$ physical servers, or $\perp$ (no valid result) if there does not exist a majority subset that have the same value. In short, the system determines if enough physical servers agree on what the new ledger should be.

The implementation of the verification function V may allow some of the arguments to be missing but it is assumed that the verifier has at least the values of a sufficient number of non-faulty nodes.

As a consequence, the non-faulty servers will agree on the same version of the ledger, assuming that sufficiently many of them are non-faulty.

The necessary number of redundant servers depends on the fault-tolerance requirements of the service. The system designer may choose any known fault tolerance solution based on the particular requirements of an implementation of the system for particular states.

Note that, in systems such as Bitcoin, fault tolerance is achieved only with massive, generally thousand-fold redundancy, with Byzantine faults being corrected by using a proof-of-work concept. Such massive redundancy will be impractical in many cases such as where a central bank wishes to implement digital cash. Moreover, proof-of-work schemes at that level typically introduce an uncertainty in the oversight and control of the system that will be unacceptable in many situations such as with central banks or governmental authorities.

Some embodiments implement a system that enables highly scalable and verifiable transfers of single-instance data sets that leverage the Guardtime KSI infrastructure summarized above. One illustrative embodiment is digital cash. This example has the advantage that it has certain features and requirements that are not present or may be relaxed in other scenarios. Transfer of cash, for example, involves the notion of "value" or "denomination, and often (but necessarily) a desire for transaction anonymity that, for example, transfer of a highly classified document file might not. The invention is not limited to such applications, however. Furthermore, embodiments are not limited to using the KSI infrastructure at all: other signature mechanisms may be used to generate proofs that can be used for verification; other timing mechanisms may be used in embodiments that use them; etc. Use of the KSI infrastructure is described by way of example only.

Assume by way of example that an embodiment of the invention is to be implemented for a digital cash system such that a central authority or administrator, such as a central bank, wishes to be able to control the emission of currency units ("bills", for short), where the holder ("owner" or "bearer") of a bill is able to request transfers, that is "payments". To increase the trustworthiness of the system, it would preferably also be possible, even without using trusted services to perform transfers, for an external party such as an auditor to be able to audit both operations.

Example Embodiment

See FIG. 7. The additional input x in a blockchain-based embodiment includes two data structures 1) an Emission order structure and process that creates new bills (that is, data sets representing respective currency units); and 2) a Payment order structure that contains information indicating any changes of the bearer of a bill.

Three component processes, which may be implemented in any computing system or group of computing systems, are: 1) a Wallet process 910, capable of creating payment orders; 2) a Central Bank Wallet (CB Wallet) process 912 capable of creating emission orders and the payment orders; and 3) a Verify process 914 that carries out a verification procedure for checking cryptographic certificates of the blockchain.

Users of the system may have respective instances of the Wallet process 910, and the Central Bank (or other central authority that issues whatever notion of "bills" is involved) should have an instance of the CB Wallet 912. The wallets, which may be configured as any known data structure, contain cryptographic keys for generating the cryptographic certificates (signatures) of Emission and Payment orders. (Note that embodiments of this system do *not* require keys to be generated according to the widely used Public Key Infrastructure—PKI—protocol, although this may be used in some embodiments depending on the preferences of the system designer, and, in some cases, of the users themselves.) Wallets may be implemented using any know data structures and coding methods.

The Verify procedure may be implemented in any known, chosen manner. How a KSI signature is verified is described above. The implementations of Wallet and CB Wallet preferably themselves contain respective instances of the Verify procedure since this will allow them to verify signatures (at least, KSI signatures) without needing to query an external trusted system to do so, but such reliance may be an acceptable option in some implementations.

The illustrated system has three main processes: Creation, Transfer, and Verification. In the context of digital cash, these may be termed Emission, Payment, and Verification. In other words, the central authority creates unique data units (such as a bill); these data units are transferred from one entity to another (such as a payer to a payee); and the parties involved or a third-party auditor should preferably be able to verify that a transfer is valid and correct. It would be possible to dispense with the Verification process if all users and other entities trust (or are required to trust) the system, but in practical implementations this will generally not be acceptable.

Emission

The Emission process changes the amount e of money in the system. New data units/bills are thereby inserted into the system, the initial owner of which will typically be the central bank (or other initial owner/holder of the data units). Note that the central bank will in many cases provide the emission service for digital cash itself, although this is not required. In some jurisdictions, for example, some commercial banks are authorized by the central authority to issue new bills. A unique identifier, such as a serial number, is associated with each data unit. In implementations in which the data units being transferred represent such items as units of digital currency, checks, instances of stock certificates or other rights, other negotiable bearer instruments, etc., all of which are examples of other types of data units/"bills", emitted bills will also have an associated nominal value.

Emission may proceed from the central bank wallet 912, which sends an emission order to the service infrastructure, which then updates the blockchain to include newly emitted bills. This may be carried out by the input component 500 or in the central controlling system 100, depending on where the associated processing functions have been chosen to be carried out in particular implementations. Note that updating "the" blockchain means here a change (or, in one embodiment, creation) of the sub-ledger associated with the newly emitted bills.

Transfer/Payment

The Transfer/Payment process changes the designation of the owner of a bill, that is, of the entity that hold the rights to it. It is therefore necessary to be able to identify both the payer/transferor and payee/transferee. In embodiments of this invention, "identify" does not necessarily imply knowledge of the actual identities of the parties involved, although this is an option. Rather, the identifiers used by the service for the parties in a transfer may maintain the parties' anonymity, such as using a party-generated public key. In other embodiments, however, anonymity may not be required, in which case any other chosen identifier may be used, such as a national ID number. In some implementations, the service may be provided not by a central governmental authority, but rather by a private entity that issues and controls other value units (whether or not convertible to legal tender of any kind) or types of data units; in such cases, the controlling private entity may also assign user/owner identifiers, which may be associated or associatable with actual identity, or not. A transfer involves changing a bearer identifier associated with that bill. To carry out a payment order (transfer request), the current bearer's Wallet sends the payment order to the Service, which then updates the blockchain (in particular the sub-ledger(s) associated with the bill(s) involved) to indicate the designated payee as the new owner. Users 400, which will include both transferors and transferees of bills, may access the service via the API 300, which communicates transfer requests and completions to the components 500 or 600. Note that different users may, and typically will, have different instances of the API 300; only one instance is depicted in FIG. 1 for the sake of simplicity.

Verification

Figure 9:
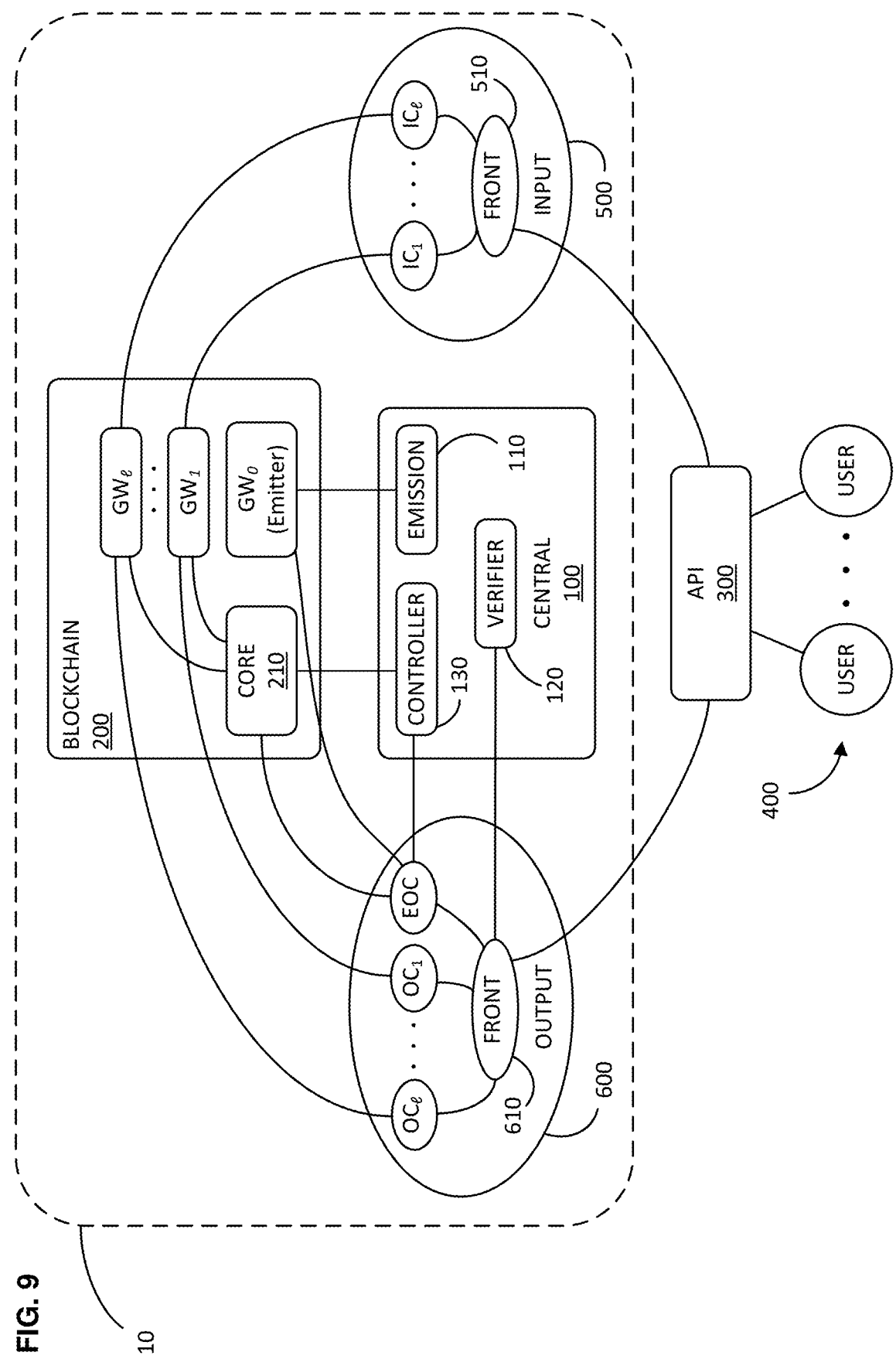
FIG. 9 illustrates information and control flow for transferring data units such as bills.

The information in payment orders, emission orders, and the different parts of the blockchain, may be made cryptographically verifiable, for example, by obtaining KSI (or other) signatures for each. The blockchain may provide the following verifiable proofs, which may be checked via the Verify process, which in turn may be carried out by a verification component located within whichever entity wishes to verify information. In FIG. 9, for example, a verification component 120 is illustrated, but similar components may be included in other entities as well, including (depending on which proof needs to be checked) in payer and payee systems as well, or in auditing systems (not shown): Different embodiments provide the following verifiable proofs, which may be checked via the Verify process:

Proof of Money (POM): a bill with a certain serial number and nominal value exists Proof of Emission (POE): a bill with certain serial number and nominal value has been emitted Proof of Ownership (POO): a bill belongs to a particular bearer Proof of Transfer (POT): the bearer of a bill has been changed from payer to payee Scalability One of the advantages of embodiments is that they are highly scalable. This results from novel decomposition of both the verification process, and the Service process. See FIG. 10.

Decomposition of the Verification

The blockchain B in embodiments here is decomposed into the following independently verifiable parts:

Emission ledger (EL), which defines which bills have been issued by the Central Bank.

List of $\ell$ gateway ledgers $GL_1, GL_2, \ldots, GL_\ell$, (only one of which, $GL_i$ is shown to avoid cluttering the drawing), each $GL_i$ of which contains $k_i$ bill ledgers $BL_1{}^i, \ldots, BL_{k_i}{}^i$. Each bill ledger is a data structure that stores information associated with a respective emitted bill. Note that such a decomposition is possible due to the concept of atomic bills.

The total number k of bills in the system is thus $k=\Sigma_{i=1}^\ell$.

To verify the status of one bill, a Wallet needs only the identity of that bill's bill ledger, and the Emission ledger EL (to verify that the bill was validly issued in the first place).

Decomposition of the Service

FIG. 9 depicts one example of some of the sub-components within the main components (shown in FIG. 1) of the Service 10.

The blockchain machine 200 may comprise: A Core, which updates the Emission ledger (EL) based on emission orders. The core may, for example, be a server system controlled by the central administrator, such as a Central Bank; and Gateways $GW_1, \ldots, GW_\ell$, as well as a gateway $GW_0$ assigned to the bill-emitting entity (such as a central bank), each of which updates a respective Gateway Ledger $GL_i$ (FIG. 8) based on payment orders, which change the owner of those bills whose ledgers are contained in the corresponding Gateway Ledger. A gateway could be a single server (physical or virtual) or other computing system, but may also be configured as a cluster of separate, gossiping, fault-tolerant servers as described above. Note that the term "gateway" is also used in many descriptions of some servers in the KSI signature infrastructure. Since embodiments of this invention do not have to use KSI signatures as proofs (although this is an advantageous choice) at all, the "gateways" described here are not to be assumed as being the same as those in the KSI infrastructure, but rather will in most implementations be separate servers/clusters even in those that use the KSI infrastructure to generate digital signatures and proofs.

The input component 500 will include a respective gateway front/interface component 510 that receives information such as payment orders, confirmations, etc., from user systems 400, and determines, based on the identifier of the bill, which of the $\ell$ sub-ledgers tracks the bill. Gateway front input components/channels $IC_1, \ldots, IC\ell$ receive payment orders from the respective front input component 510, as well as any input queries from the respective gateways. It then routes, for example, the payment order information for the bill to the correct, corresponding gateway $GW_1, \ldots, GW\ell$, (determined based on the data unit identifier) via the respective gateway front input components/channels $IC_1, \ldots, IC\ell$.

To complete a transfer/transaction, the gateways $GW_1, \ldots, GW\ell$ will route transfer information via respective gateway output sub-components/channels $OC_1, \ldots, OC\ell$, so that the front output component 610 may communicate with the recipient/payee user, for example, via the API 300. The front output component 610 is preferably also configured to perform such tasks as caching payment information, access control, filtering, and serve as a routing layer between the client API and gateway output component $OC_1, \ldots, OC\ell$ instances.

Figure 8:
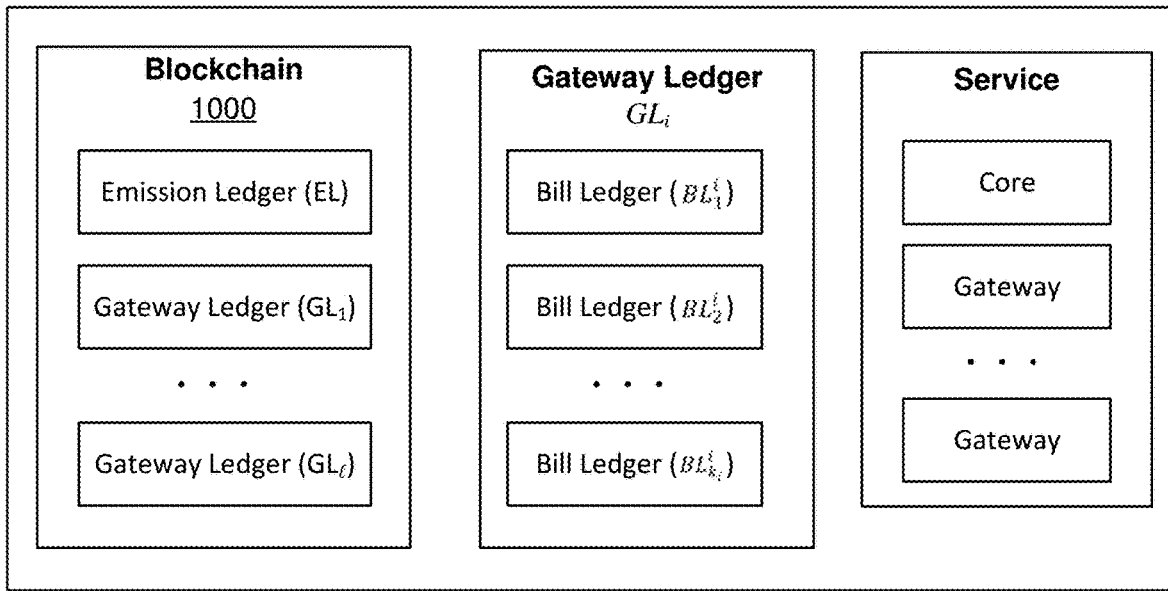
FIG. 8 illustrates decomposition of a blockchain into gateway ledgers and bill ledger.

Emission of new bills is, as mentioned, under the control of the central system 100, such as a server or server group under the control of a central bank. The central system 100 thus includes a controller 130 configured to communicate with the core 210 of the blockchain machine and with the emitter output component EOC. An emission component 110 is also provided, which communicates with a dedicated emitter gateway $GW_0$, which may then incorporate any newly emitted bills into the corresponding emission ledger EL (FIG. 8). In order to get new bills into circulation, that is, into the wallets of users, one example of which would be commercial banks, the emitter gateway $GW_0$ may communicate with the output component 600 via a dedicated emission output component EOC. The emitting entity, such as a central bank, may then act as a transferor of newly emitted bills, whereby transferees might be commercial or reserve banks, private entities, or any other "user" with an identifier in the system.

Sharding Function λ and Service Configuration

In one embodiment, predetermined bits of the serial number (or of the identifier of whatever other data sets the system has been implemented for) of a bill determine with which gateway ledger it is associated. Association may be of two types: 1) in some embodiments, the gateway itself stores and maintains the data structure that comprises the sub-ledger and bill ledger (described below) that an identifier directs to; and 2) in some embodiments, the sub-ledger is included in a data structure that defines the respective data unit itself, and is passed by a transferor to a gateway upon a transfer request. For now, the description will focus on case 1).

As one example of a method for associating data units with gateways (that, is sub-ledgers), assume there are $\ell$ gateways in the system, where an identifier of each gateway is an m-bit number, where $m=\log_2 \ell$. The m highest order (or other) bits of a bill's serial number may then be used to "point to", that is, determine, in which gateway the bill's ledger is maintained and/or processed.

Figure 10:
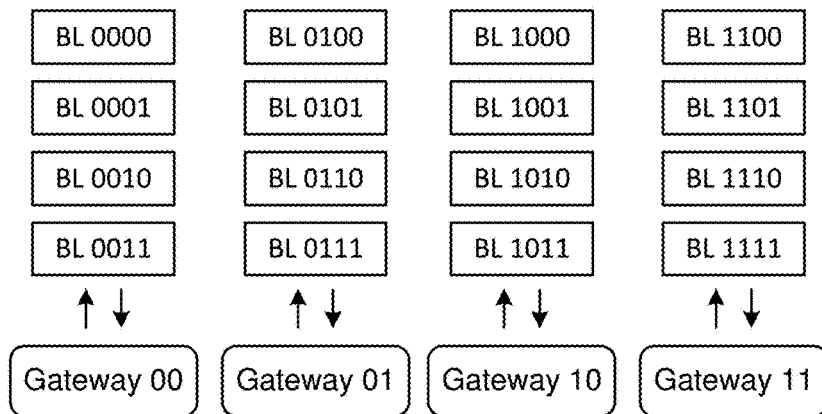
FIG. 10 shows one simple example of how bills are associated with gateways.

FIG. 10 depicts a sample, and simple, configuration with 16 bills in the system, and four gateways, such that each gateway maintains the ledgers for four bills. Thus, in the illustrated case, $\ell=4$ and $m=2$. The identifiers of the 16 bills in this example are thus 0000, 0001, . . . , 1110, 1111, and the gateways are numbered 00, 01, 10, and 11. Assume that the identifier of a bill is 1001. Since the two most significant bits (MSB) are 10, any transactions relating to the bill will be directed to Gateway 10, which holds the bill ledger 1001 for the bill. Note that one advantage of this arrangement is that bill identifiers may be chosen to help balance the expected load on the different gateways. If the maximum number of bills is k=$2^n$, they have at least n-bit serial numbers. This means that, on average, in an equally load-distributed configuration, every gateway will maintains $2^{n-m}$ bill ledgers.

The sharding function $\lambda(x)$ may, for example, be defined to be 0 if x is an Emission order, since this will not correspond to any particular gateway. If x is a Payment order, however, then $\lambda(x)$ may return the m highest bits of the bill's serial number. The identifier i of the gateway that operates a payment order x (called the associated gateway) may thus be computed from the bill's serial number via the sharding function: $i=\lambda(x)$. In short, a function is applied to the identifier of each bill to determine with which one of the gateways (and thus ledgers) it is to be "assigned" to.

Data Structures

Embodiments rely on several data structures and the processes by which they are established, changed, and maintained. These include different notions of "blockchain", data signatures, etc.

Blockchain

As used herein, a Block is a cryptographically verifiable data structure that consists of Data D and a Signature S:

A blockchain is an enumerated sequence $B_1, B_2, \ldots, B_n$ of blocks defined recursively:

Block $B_0=(D_0, S_0(D_0))$ is called the genesis block, where $S_0(D_0)$ is a signature of $D_0$ Block $B_n=(D_n, S_n(D_n, B_{n-1}))$ where $S_n(D_n, B_{n-1})$ is the signature of all or at least some defined sub-set of the data $D_n$ in the previous block $B_{n-1}$.

Block Signing

In one implementation, Data D in a block is a sequence $(d_0, d_1, \ldots, d_k)$ of hash values, which typically have a fixed size, and the sequence (some of whose values may be missing) is signed. Any known signature method may be used, but the KSI signature has the advantage that there are in general no more syntax or semantics rules that a KSI blockchain has to fulfill. Signature S is a KSI tree signature KSITreeSig($d_0, d_1, \ldots, d_k$) on D.

For every item $d_i \in D$ one can compute a KSI signature, in the form of a chain $c_i$=KSISig(i, D) for $d_i$, which forms a cryptographic proof that $d_i$ is the i-th component of D. In other words, if the value i is included as a parameter along with associated data in the input to the KSI signature system, the signature vector returned will enable recomputation through the KSI hash tree up to an irrefutable, known value, that is, the corresponding calendar value, but only if the correct value i is included as a parameter in the input submitted for verification.

KSI Signatures

U.S. Pat. No. 8,719,576, mentioned above, gives a more detailed explanation, but the use of KSI-generated signature is summarized here for completeness. One feature of the KSI signature system is that it operates in time periods, which may be referred to as "calendar periods", "aggregation rounds", etc. For every calendar period t, the KSI system inputs values as "leaves" (lowest-level values), combines these in a Merkle tree, computes a current root value (the "calendar value") $r^t$ and then may return to each "leaf" entity the signature vector allowing recomputation of $r^t$ given the same leaf value as was input.

KSI Signature KSITreeSig

Figure 11:
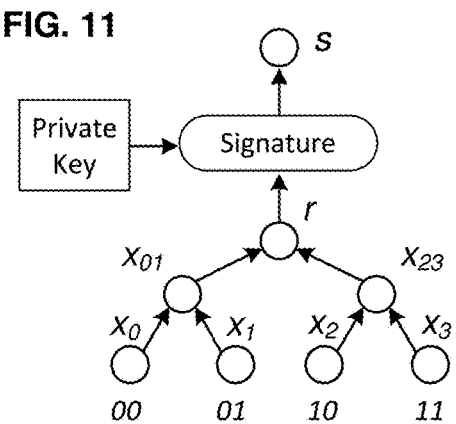
FIG. 11 is a greatly simplified illustration of one method for generating digital signatures.

More formally, a KSI tree signature s←KSITreeSig($x_0, x_1, \ldots, x_k$) for a sequence $x_0, x_1, \ldots, x_k$ of hash values is computed via the following steps. FIG. 11 illustrates a KSI tree signature for k=3:

1) A Merkle hash tree with leaves $x_0, x_1, \ldots, x_k$ is computed

2) The root hash r of the tree is rendered irrefutable, that is, s←S(r)

One way to render the value r irrefutable with respect to a particular entity is to sign it using any known public key signature algorithm (depicted as "Signature"); this may then tie the irrefutability to the holder of the public key. Another way would be to include the entity's private key as part of the lowest-level input, that is, as either a tree "leaf" itself or as a parameter included in the input set. of some other leaf.

If s is a KSI tree signature for a sequence $x_0, x_1, \ldots, x_k$, then for every i=0, 1, . . . , k, the KSI signature KSISig(i; $x_0, x_1, \ldots, x_k$) is a pair (s, $c_i$), where:

1) s is the KSI tree signature: s←KSITreeSig($x_0, x_1, \ldots, x_k$)

2) $c_i$ is the hash chain of the i-th leaf of the KSI Merkle tree to the root ("calendar") value r, and may be extended to S or even further to a publication value obtained by aggregating calendar values.

FIG. 11 illustrates a simple tree, with i=4 ("leaves" 00, 01, 10, and 11), having values $x_0, x_1, x_2,$ and $x_3$, respectively and $c_0$=(00; $x_1, x_{23}$), $c_1$=(01; $x_0, x_{23}$), $c_2$=(10; $x_3, x_{01}$), $c_3$=(11; $x_2, x_{01}$)

Thus, consider the hash chain for the second hash tree leaf from the left in FIG. 11, that is, the leaf at position i=$01_2$. The indicated value is $x_1$ (which may itself be a function, such as a hash function, of the "raw" input data). For this leaf, the chain is $c_1$=(01; $x_0, x_{23}$). To compute up the tree from $x_1$, $x_1$ is first hashed with $x_0$ to yield $x_{01}$. $x_{01}$ is then hashed with $x_{23}$ to yield r, assuming that the recomputation starts with the exact same $x_1$ as was used in creating $c_1$.

Note that the order of the signature elements may be chosen to be different than that shown, as long as the chosen order is known and maintained as a convention by the signature-generating entity, and all parties that need to verify data given its signature.

"Cash" Blockchain

In the context of money, "cash" has the property that each unit ("bill") is uniquely identified, for example, by its serial number, has a set value (denomination), and has a requirement for well-controlled emission (no counterfeiting). These properties may also be found in other unique-instance, and uniquely identifiable, data units that embodiments may be used to enable provably unique transfer of. In the context of digital cash (or the like), the data part D of a block $B_t$=(D, S) includes (in some embodiments):

Emission order E (optionally null, that is, E=∅)

A sequence of Payment orders $P_1^t, P_2^t \ldots, P_k^t$ of length k, where k is the number of bills in circulation. Any $P_i^t$ can also optionally be "null", indicating that no payment order was generated at all for the given value(s) of t.

In embodiments in which the KSI infrastructure is used to generate signatures, the signature part S may be a chained KSI tree signature ($c^t, x^t$), which may be defined recursively:

$$x^0=(x_0^0, x_1^0, \ldots, x_k^0)=(h(E^0), h(P_1^0), \ldots, h(P_k^0))$$

$$c^0=\text{KSITreeSig}(x_0^0, x_1^0, \ldots, x_k^0)$$

$$x^t=h((x_0^{t-1}, E^t), h(x_1^{t-1}, P_1^t), \ldots, h(x_k^{t-1}, P_k^t))$$

$$c^t=\text{KSITreeSig}(h(x^{t-1}, D_t))$$

where h is a cryptographic hash function. Thus, for each payment order, a signature (KSI or otherwise) is generated, which preferably encodes the signatures of previous payment orders.

In other embodiments, instead of including the entire past signature chain, only the immediately previous signature may be included. In the KSI structure, for example, the calendar encodes all previous signatures as well, and also is synchronized with time, such that the previous signature will also be irrefutably time-stamped.

It is not necessary for data unit transfer requests to be grouped into "rounds" or to be otherwise time-limited—a transfer request may be kept "pending" until all information exchange has completed and ownership has been changed to the transferee. One advantage of doing so, however, is that it makes it possible to ensure a maximum settlement time (assuming no system failures), or at least a time by which a transfer request must either have completed or been denied. Grouping transfer requests also makes generation of proofs more efficient. In some embodiments, therefore, data unit transfer requests are received in input/aggregation periods, such that there is a specific cut-off time. Use of the KSI signature infrastructure has the advantage that it is already configured to generate signatures in calendar periods, which are typically of a fixed length such as one second. A KSI signature thus "automatically" provides not only proof of correctness of an input, but also a timestamp. If such time-based grouping is implemented, other synchronization mechanisms may, however, be used instead. It would also be possible to "batch" input requests until some minimum number of requests have been received, before completing the transfer requests, or to implement any other such rules. Such "batching" may, however, lead to uncertain settlement times, but that may be acceptable in some contexts.

In many cases, there may be a large number of input periods in a row during which a bill, or a particular bill, is not transferred at all. Rather than actually iteratively hashing even the "null" $P_i^t$ values, an incrementing index nullinarow may be included instead. During verification, this index may indicate how many consecutive null values occurred, such that the verifier will know to hash the non-null P value just before the no-transfer periods nullinarow to get the non-null P value just after those periods end. In other words, the index can be used to reduce the number of hash computations needed up-front to only those relating to actual payment orders, with remaining hashing computations being done only as needed later for verification. Note that, if the KSI signature infrastructure is used, the index nullinarow itself may be derived from the time indications of the signatures of the non-null payment orders at either "end" of the null-periods, such that it would not be necessary to explicitly include nullinarow at all.

Ledger Decomposition

Figure 12:
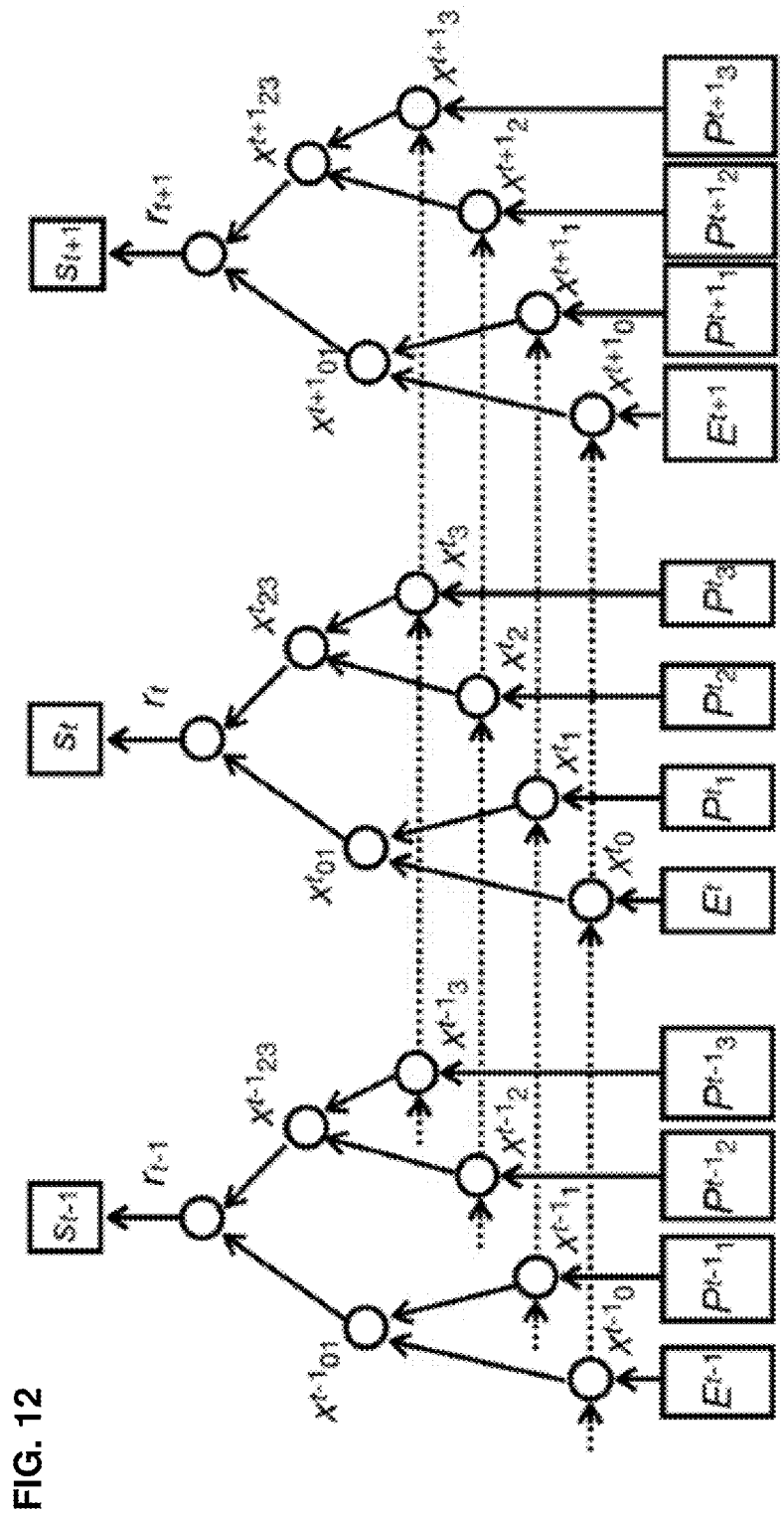
FIG. 12 illustrates one example of a ledger structure.
Figure 13:
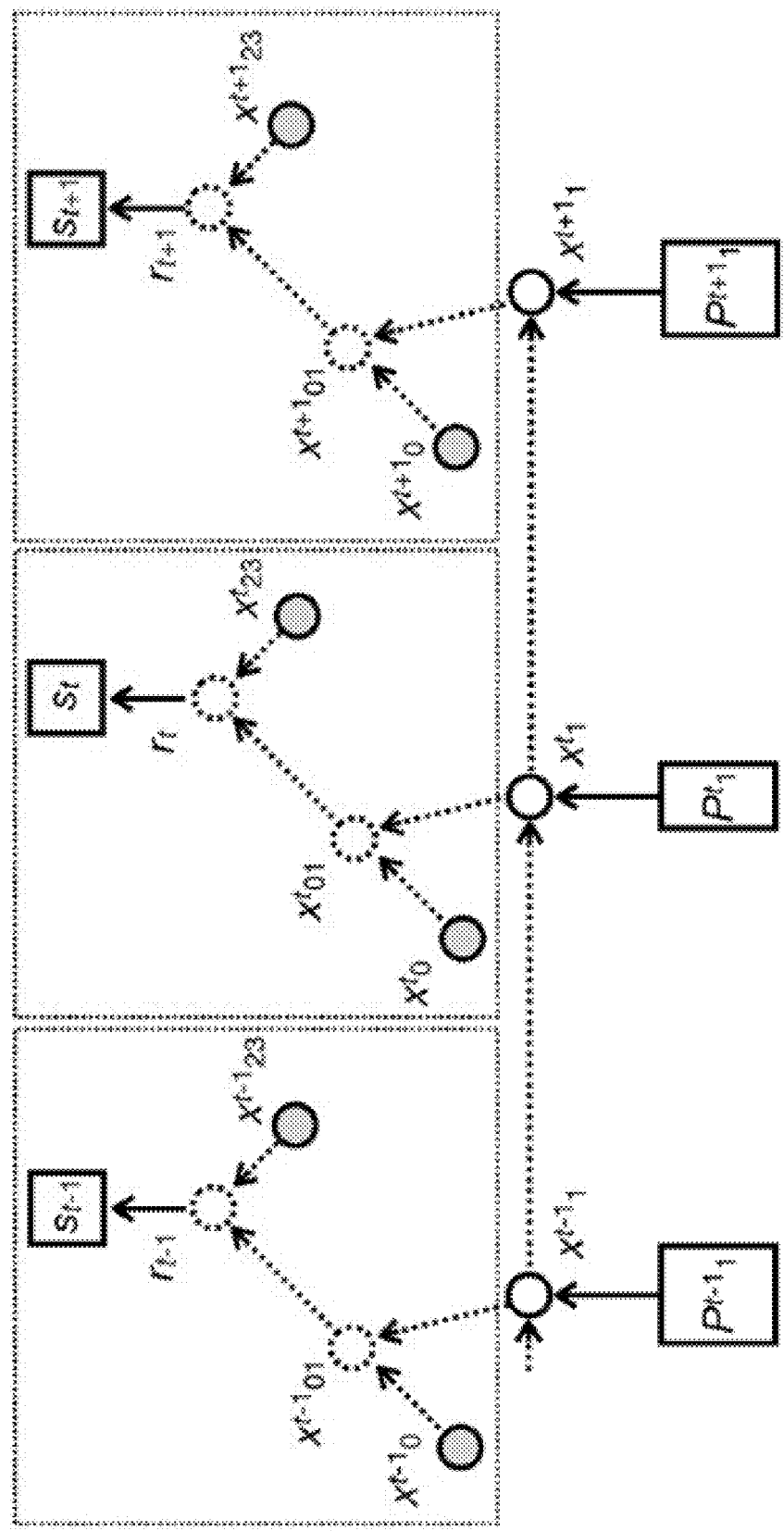
FIG. 13 depicts extraction of a subledger.

Continue to assume by way of example that KSI signatures are used. (Suitable similar operations may be used for other signature schemes, as skilled system designers will appreciate.) The blockchain can be decomposed into:

Emission ledger E with blocks $(E^0, c_0^0)$, $(E^1, c_0^1)$, ..., $(E^t, c_0^t)$, where, for the genesis block, $c_0^j = \text{KSISig}(0; x_0^j, x_1^j, \ldots, x_k^j)$ Bill ledgers $BL_1, BL_2, \ldots, BL_k$, where $BL_i$ has blocks $(P_i^0, c_i^1), (P_i^1, c_i^1), \ldots, (P_i^t, c_i^1)$, where $c_i^1 = \text{KSISig}(i; x_0^j, x_1^j, \ldots, x_k^j)$ A novel structure of the KSI ledger is depicted in FIG. 12 and the way of extracting the subledger $BL_1$ is depicted in FIG. 13.

Emission Ledger

Figure 14:
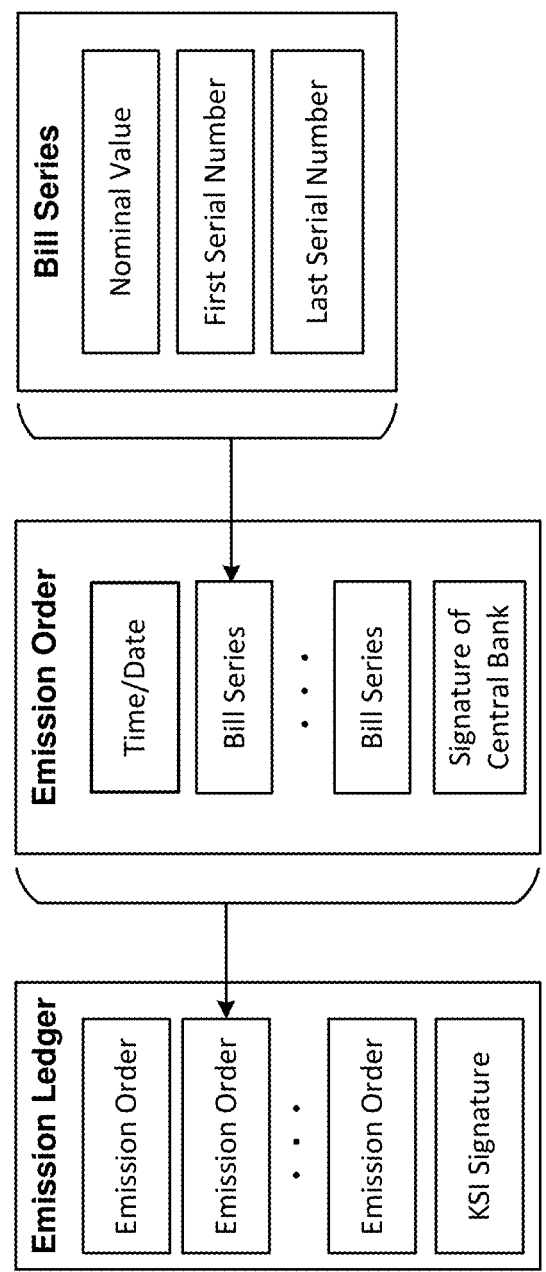
FIG. 14 illustrates an example of emission ledger data structures.

Various data structures provide proof that a bill was validly issued and is still validly in circulation. These include the Emission ledger itself, which includes or communicates with data structures relating to Emission order and Bill series. See FIG. 14.

Emission Ledger includes:
List of Emission orders
Proof of the state/contents of the emission ledger, which may be a KSI signature
Emission order preferably includes:
Time/Date of emission
List of Bill series
Proof of emission, which may be the signature of Central Bank
Bill series includes:
Nominal value of the bill
First serial number
Last serial number (if a serial number never changes, this and the first serial number may be combined into one)

Bill Ledger

Figure 15:
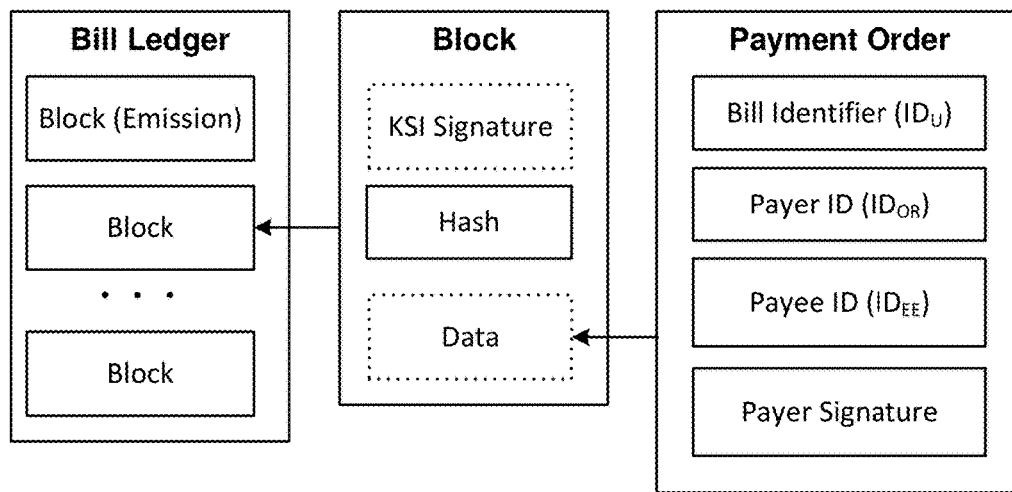
FIGS. 15-17 illustrates bill ledger data structures, with FIG. 16 illustrating a full bill ledger and FIG. 17 illustrating a reduced bill ledger.

A Bill ledger is created for each bill and forms a "sub-ledger", in that it tracks only a subset of the bills in circulation, namely, the bill to which is it assigned. The Bill ledger may be a list of blocks, the first of which may be called the Emission block. See FIG. 15.

Each block contains:
Proof part, such as a KSI or other signature
Block hash
Data part The Block hash may be computed as the hash of a concatenation of the data part and the previous block hash. In case of the first block, it may be the hash of the data part.

The Proof part may be either empty (null) or contain a signature of the block hash.

The Data part may be either empty or contain a Payment order with, for example, the following fields:
Serial number of the bill
Payer identifier, such as the payer's public keyA cryptographic hash of the data part of the previous block with non-empty data part
Public key (of the payee)
Signature (of the payer), which preferably verifies with the public key of the previous block with a non-null data part or, in the case of the emission block, with the public key of the emitting entity, such as a central bank.

Figure 16:
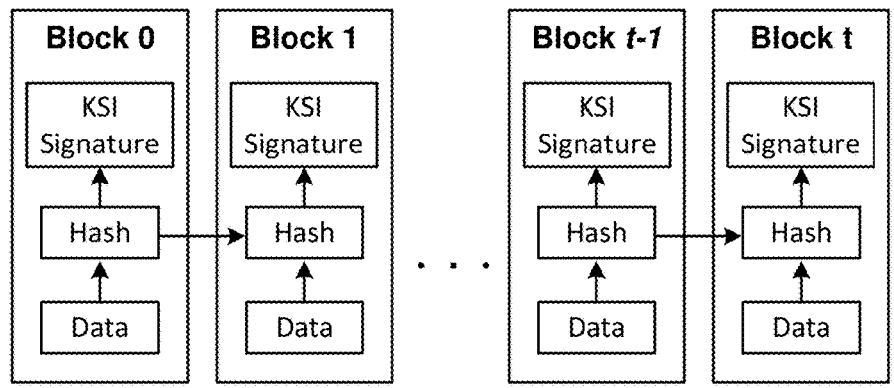
Figure 17:
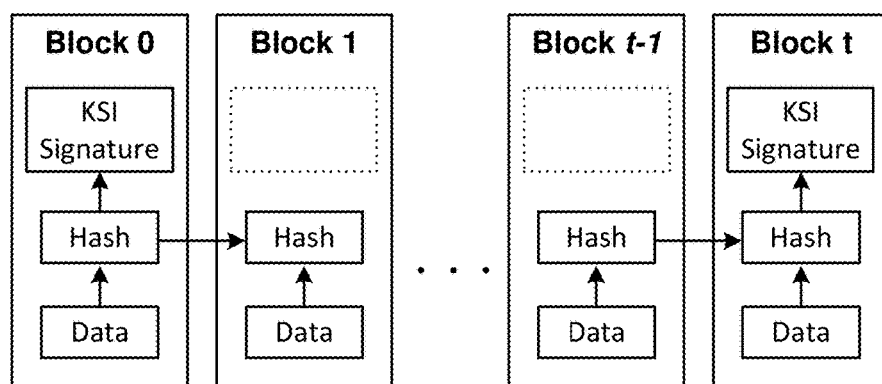

The Emission block will always have a non-null data part, since it represents the issuance of a valid bill. A bill ledger is full if all of its blocks have non-empty proofs (FIG. 16) and a bill ledger is reduced if only the emission block (Block 0) and the last block has a non-empty proof (FIG. 17). As before, and as described above, blocks corresponding to times at which no transfer occurred may be "compressed out" by using an index, or the time-synchronized nature of a KSI signature, or both.

Proofs

Embodiments of the invention provide several proofs that enable verification of the status of a bill and of a transfer, and thus allow for easy auditing of the system as a whole and its various functional parts. These proofs include Proof of Money (POM), Proof of Emission (POE), Proof of Ownership (POO), Proof of Transfer (POT). These proofs may be KSI signatures, that is, hash chains leading to an irrefutable root, which may be recomputed from a given "candidate" input value—if, recomputing the KSI hash chain upwards with the sibling values in the signature, the same root value is reached as when the respective structure was signed, then the candidate input value must be the same as the original value for which the signature was generated. Any other known signature method may be used instead, however, depending on the level of security and auditability desired in each given implementation of the invention. Each proof has an Input, and Output, and Semantics, such as:

Proof of Money (POM)
  Input: Serial number (identifier) of the data unit
  Output: Correctly verifiable emission (first) block of the bill ledger with this serial number
  Semantics: The bill with the given serial number that has been "printed" by central bank. In the more general case, this is the data unit that has in some way been initiated by the central or originating system, with a unique identifier.

Proof of Emission (POE)
  Input: Serial number of the bill
  Output: Correctly verifiable Emission ledger which shows that a bill with the given serial number has been emitted.
  Semantics: The bill with the given serial number has been emitted (issued) by central bank Proof of Ownership (POO)
  Input: Serial number of the bill; unique identifier of the current owner, such as the current owner's public key; time t
  Output: Correctly verifiable (reduced) bill ledger of the given serial number having t blocks in which the last block with non-empty data part contains the given public key (or other identifier) and the payee's public key (or other identifier)
  Semantics: The bill with the given serial number is owned by the given public key at time t Proof of Transfer (POT)
  Input: Serial number of the bill, Public key (of the new owner, that is, the payee), time t
  Output: Correctly verifiable (reduced) bill ledger of the given serial number with blocks $B_0, B_1, \ldots, B_t$ in which the data part of the last block of the ledger $B_0, B_1, B_2, \ldots, B_{t-1}$ has the payee's public key, the corresponding private key of which need not be controlled by the wallet.
  Semantics: The bill with the given serial number was not owned by any of the keys in wallet at time t−1

Together with the Proof of Ownership this means that the payee has been paid at t with the bill of the given serial number. The payee may request Proof of Transfer after, for example, being notified in any conventional manner of a transfer by either the payer or by the service itself.

Every digital bill in embodiments of this invention may thus be provided with a cryptographic proof that can be verified without relying on the trustworthiness of the operator of the service (for example, the central bank) or intermediaries. The correct operation of the system as a whole is also provable in real-time, which makes it secure against both inside and outside attacks on the integrity of the system and allows continuous mathematical verification of the total money supply, greatly reducing the cost of operations. In implementations in which KSI signatures are used as proofs, the only cryptographic primitive used in verification (of the money supply as a whole or individual bills) is a hash function (for example, SHA256 or SHA512), which means that the proofs are designed to withstand potential attacks by quantum computers.

Protocols
The main steps ("protocols") of Printing (creating new digital bills), Emission, Payment, and Bill Ledger Adjustment carried out by the different entities ("parties") in the system are summarized here.

Figure 18:
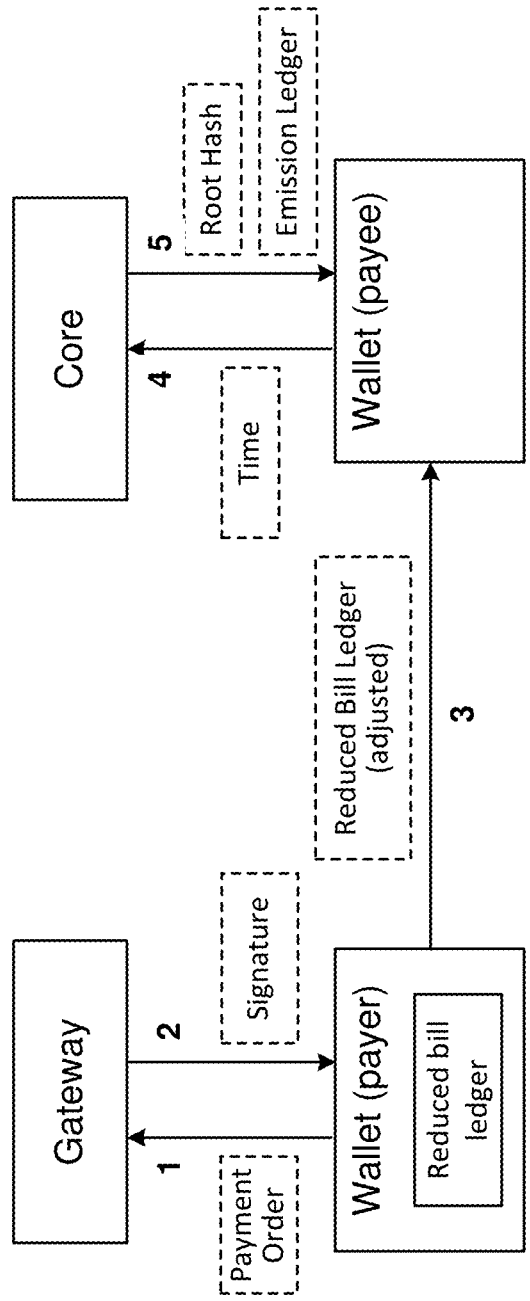
FIG. 18 illustrates messages during a transfer.

Printing
  Parties: Central Bank, gateway
  Messages/steps:
    Central Bank creates and signs the emission blocks of a series of bills
    Central Bank sends the signed emission blocks to the respective associated gateways
    Dedicated gateway stores the emission blocks as the first blocks of new bill ledgers Emission
  Parties: Central Bank, Core
  Messages/steps:
    Central Bank prepares and signs a new Emission order and sends it to the core
    The core adds the new record to the emission ledger Payment
  Parties: Payer's wallet, Payee's wallet, Gateway, Core
  Messages/steps (FIG. 18):
    1) Payer wallet (a data structure and process within the corresponding user's computing system) signs a payment order and sends it to the associated gateway
    2) Gateway replies to the payer wallet with a KSI (or other) signature, which it may obtain by submitting a corresponding request for signature to whatever system implements the KSI infrastructure (if the KSI system is used for signatures), such as system 700 (FIG. 1)
    3) Gateway combines the payment order and the KSI signature to a block $B_t$
    4) Gateway adjusts the reduced bill ledger as described below. Note that, at this point, from the perspective of the gateway, the transfer will already have occurred—the payee is now the new "registered" owner of the bill in the bill ledger—and what remains is to inform the payee of this fact such that the payee can verify it
    5) Gateway sends the adjusted bill ledger to payee wallet
    6) Payee wallet requests the corresponding root hash and the Emission ledger from the core, thereby verifying not only that the payment order was correctly processed by the gateway, but also that the bill involved in the payment is valid
    7) Payee wallet verifies the proof of transfer based on the received Bill ledger and the information from the core Bill Ledger Adjustment Procedure (FIG. 19)
Let L' be the reduced bill ledger in Payer's wallet with blocks $B_0, B_1, B_{t'}$; let $B_t$ be the new block of the bill ledger created by combining the payment order and the KSI signature obtained from the gateway that controls the respective bill; and let t>t' be the time value in KSI signature.

The adjustment procedure involves the following steps:
  1) Wallet creates t−t'−1 empty blocks $B_{t'+1}, \ldots, B_{t-1}$ and adds them to L'
  2) Wallet adds $B_t$ to L'

Figure 19:
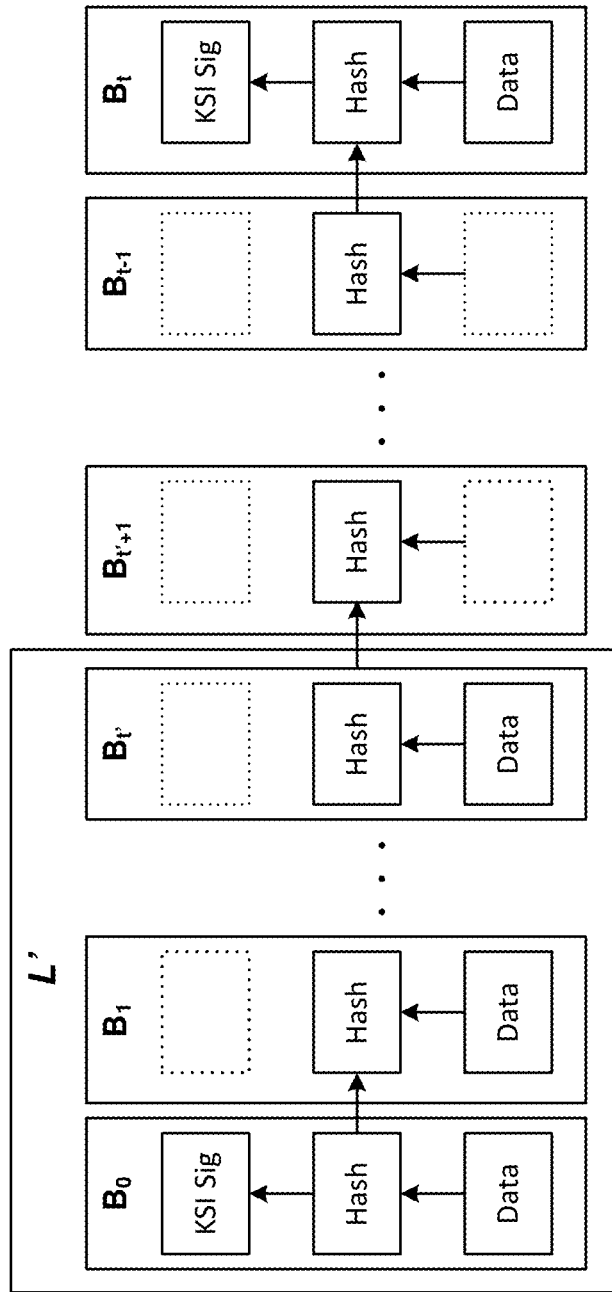
FIG. 19 illustrates adjustment of a reduced bill ledger.

The adjusted ledger is depicted in FIG. 19.

Wallet Query
Users may wish or need to know what bills they control, that is, what bills are in their respective Wallets. This may be accomplished, via the API, by issuing a query to the output component 600. The query should then include both the owner's identifier, and the owner's signature, such as public key. The output component may then return a list of the bills associated with that public key. It would also be possible to specify time ranges for the list to be retrieved, or to request, for example, the list of only the n most recent changes in the user's wallet; this would also enable confirmation of a most recent transfer.

Prevention of Double Spending

A major concern in all systems that involve transfer of a single valid instance of a data set is "double spending". In other words, a recipient (such as a payee) should be able to know that the sender (such as a payer) did not also transfer the same data set to some other recipient as well. In the context of digital cash, for example, a payee needs to be sure that the payer did not also give the same bill to another payee.

Embodiments of this invention have several mechanisms that can not only detect attempted double spending, but can prevent it from happening at all. According to one optional feature, transfer requests are received per input period, that is, with a cut-off time. As one example, transfer requests may be synchronized to some time base, such as KSI calendar periods. A ledger rule is then implemented such that no more than one signature may be requested per bill per calendar period. Alternatively, the ledger for each bill may be configured so as to accept no more than one request for update per settlement period, which may be the same as a KSI calendar period, or may be synchronized (to set a "cut-off") to any other time system.

As described above, when a gateway has received a request to transfer ownership rights of a data unit, it updates the respective sub-ledger and (preferably) obtains (and may return to the payer) a digital signature confirming the transfer order. Already at that point, if the requester were to attempt to request yet another transfer of the same data unit, the request will be rejected, since the respective sub-ledger will already have been adjusted to indicate that the requester is no longer the owner of the data unit. Moreover, since, in this case, transfers "settle" at the end of a calendar or other synchronization period, the only way a payer could attempt to double-spend a bill would be to request yet another signature in another calendar period. By that time, however, the earlier, valid transfer will already have been either completed by the gateway, or has enqueued it for transfer, in that the earlier signature will already have been entered into the bill ledger, along with the key of the new owner—by the time the payer attempts to double-transfer the bill, he will no longer be the owner and thus will be unable to do so. In practice, this means that, once a payer has issued a valid payment order and this has been acknowledged by the service, the payer no longer "owns" the bill and thus cannot spend it again.

Implementing settlement/update "periods" has the advantage of enabling aggregation of transfer requests, which then leads to an efficient use of signature mechanisms (such as KSI) that create signatures for groups of inputs during such periods. It would be possible, however, not to implement such periods at all. Gateways could, for example, process transaction order immediately, as fast as possible, and use other non-aggregating signature schemes.

No Inter Sub-Ledger Communication Necessary

One advantage of embodiments of this invention is that decomposition of the blockchain into sub-ledgers as disclosed here does not require inter-shard, that is, inter subledger communication and coordination. Because the ledgers' state is divided into sub-units that don't have cross-dependency, there is no need to know state of any other data unit, or consult the state of any other sub-ledger, in order to process and complete a transfer of a given data unit. This contrasts with prior art systems such as Ethereum, in which there must be inter-ledger coordination, because its data "units" are transferred from one ledger to another. Embodiments of our invention do not require cross-chain interaction.

Owner-Held Bill Ledgers

In most of the description above, and in FIG. 8 (among others), bill ledgers are stated or illustrated as being stored within gateways responsible for respective sub-sets of the emitted data units. This is not the only alternative, however. As was briefly mentioned about, given that data units being transferred are logical rather than physical, a data unit, such as a "bill", in practice is (or at least can be viewed as being) the data structure in which its state is defined, in particular, its identifier, ownership state, as well as other possibly optional information such as a denomination, stored in blocks of a blockchain. As such, it would instead be possible for the current owner of the data unit also to be the entity that stores and transfers the entire data structure representing the data unit to the respective gateway upon a transfer request, along with the identifier of the intended transferee. The gateway, in its gateway ledger, may then make an entry indicating the request to transfer, which also may be used to prevent double spending, since any subsequent request to transfer the same bill would, by the nature of the blockchain sharding arrangement, also need to be directed to the same gateway. This aspect of the invention may be used together with any of the embodiments described herein (except for the one in which subledgers are stored within gateways, since this aspect replaces that arrangement).

Embodiments for Transfer of Parts of Whole

In some cases, instead of needing to verifiably transfer individually identifiable units of something from a sender to a recipient, what is needed is to do so for some quantifiable part of a whole "asset". In such cases, the sender may have a "stock" or "account" of items, that is, some quantifiable amount of the asset, and ownership of some number (including all) of these is to be transferred to a recipient, whereby the amount is deducted from the account of the sender and is credited to the account of the recipient (minus, in some implementations, intermediate changes such as deductions for taxes or fees). The transfer is thus "zero-sum".

In this embodiment, instead of individual data units being "assigned" or associated via their unique identifiers, an identifier of an account is used to associate it with a corresponding gateway. As with data units, this makes it possible for each gateway to hold subledgers corresponding to only a subset, or even just one, of all accounts, using a sharded blockchain structure, which similarly allows for an exceptionally high degree of scalability.

In cases in which the items to be transferred are by their nature in digital form, the transfer may be made final as soon as some clearing procedure has completed. In some other cases, especially (but not exclusively) in which the items are physical or otherwise not possible to actually transfer in digital form, digital information may be transferred instead that represents unique ownership and can be used to claim actual ownership and control of the underlying non-digital items. In still other cases, the items to be transferred are digital, but the verifiable and enforceable claim to actual ownership may be delayed until some later time.

One example of a purely digital transaction scenario is where users have accounts and a transfer is a "payment", that is, a transfer of an asset such as money from a sender's account to a recipient's account. The assets in the "account"

or "stock" of a sender could also be a set of authorization codes, frequent flyer "miles", authorized copies of a data file (such as of music or video), forms of loyalty "points", etc. Each account is a data structure associated with the respective user.

Physical assets could be of any type. A unique identifier associated with each, encoded in a digital message, may then be part of the "asset" that is transferred, such that it becomes "owned" by the recipient and is no longer owned by the sender, that is, the sender is no longer able to transfer or otherwise control the data associated with that identifier. The physical assets need not be easily separable. For example, the sender might have (either physically or as an account balance) in its "account" an amount of something like grain, or oil, or some other such product that can be divided into quantifiable portions. The asset being transferred from the sender's to the user's account may then similarly be a digital message that specifies an amount to be transferred.

In all these cases, the information that specifies how much of the sender's asset that is to be transferred may be called a "transfer order" or "payment order" (PO). In the following description, the example is used of the transfer from one account of some asset (products, single-instance files, money, points, indications of quantities of a good, etc.) from a set or amount of such assets in a sender's account to a recipient's account.

A PO in this embodiment is similar to the data units in the embodiments disclosed above in that it is a data structure that includes fields with data corresponding to attributes such as an identifier of the sender (such as a key), an identifier of the recipient account (again, such as a key), the sum or quantity to be transferred, a PO proof generated using a wallet key, and any other information the system designer wishes to include. In short, a PO here is an instruction or message from a sender (client wallet) to the sender's associated gateway to transfer an amount of the sender's asset from its account to another, namely, a designated recipient's account, secured using a PO proof.

Before a PO can be executed, it is preferable for the gateway associated with the sender, or some other superior entity, to confirm that the PO may be executed. For example, the gateway may check its ledger/blockchain to ensure that the sender's account (its balance) holds enough of the asset to allow for the transfer. Other rules may also be stored in or accessed by (for example, from a central administrator) the gateway and have to be met before the gateway approves the PO. For example, transfers above some threshold amount might be either prohibited or subject to additional approval or a reporting requirement; transfers to certain recipients, or to entities within or outside some physical or logical boundary might be similarly restricted; etc.

Once the sender's respective gateway has received and approved a PO from the correct wallet owner, with that owner's private key, the gateway may then subtract ("debit") the sender's account with the amount according to the PO. The gateway may then generate a "check", that is, a data structure that it delivers to the designated recipient's respective gateway (shard), which manages the account of the recipient. The recipient's gateway may then process this check, involving potentially validating included signatures or other credentials, and crediting the recipient's account by creating and entering into the corresponding subledger a block indicating the addition to the previous balance.

As discussed above, each gateway maintains a ledger, that is, sub-ledger, and in this embodiment each block of the ledger encodes one debiting operation. One advantageous consequence of this is that transaction information is transportable: By extracting the desired data structure and its gateway proof, it can be delivered to any other entity. In the respective data structure for an account-holder, there is a reference to the public key of the account owner, the new sum, information about each PO, and recipient data. Only a recipient, via its respective associated gateway, can conclude and receive the transaction. Each block of a ledger contains one PO, but a full block with its gateway proof (which can be shared) is the check. Here, a gateway proof is a signature that encodes information indicating that the gateway has performed necessary validation steps and has signed the underlying information.

As a gateway produces a gateway ledger, this may then be delivered to a respective output component 600, which may then extract proofs of gateways where accounts reside. Similarly, the input component(s) 500 may be the entity/-ies through which a received check may be routed. The input component may then deliver the check to the respective gateway itself, which may then validate the information.

One process for clearing, that is, finalizing, transactions, proceeds in rounds, that is, time periods, as in the unit-transfer embodiment described above. In this example procedure, the gateway ledger records all POs and account balances after each round in which a transaction occurred. ("Null" transactions may also be implemented if it is desired to ensure one ledger entry per round.) The state of the ledger and/or account, at the end of each round and/or change, may be protected with a proof, for example, a hash tree-based signature The output component for a gateway may route checks (PO with gateway proof) to relevant shards/other gateways based on a lookup service or some other fixed relation between accounts and gateway instances. Any entity enabled to verify the blockchain and that thus has access to relevant information may then detect non-cleared checks and resend them for processing as needed. Other routing mechanisms are, however, possible, such as direct gateway-to-gateway communication (instead of via input/output component mechanisms), through a wallet API, etc. To ensure debiting, each clearing/credit transaction may record a reference to a "source block" with the respective PO with a cryptographically one-way dependency.

There should preferably be a guarantee that only one instance of the ledger data structure exists. One way to ensure this is to allow only one transaction of an asset (or part of asset) per round, with the ledger being signed (and optionally also timestamped, such as with a KSI signature) upon either each change, or at the end of each round, thereby "sealing" its state at that time.

The output component associated with each respective gateway is preferably accessible to an external auditing entity. Consider the threat that a sender collaborates with its gateway to create multiple versions of a ledger, or even "lend out" some of the sender's asset "off the books". Each recipient is preferably associated with a specific output component, and each such component is accessible, so that the auditing entity may query all or some sub-set of the output components, for example at random times. Each output component then responds with the state of its associated account, along with the corresponding gateway proofs, at those times. Over time, as the number of "query points" increases, the probability of successfully concealing "lending" out gets smaller.

As for transparency, outside parties should preferably not be enabled to see entire ledgers, but at most only individual account blocks within it. On the other hand, a central authority or auditor may be enabled to inspect all ledgers.

Note that this represents a difference relative to most existing blockchain systems, in which the trustworthiness of the system depends on all blocks being made public.

Various mechanisms may be used to set up accounts and "emit" assets, that is, establish at least initial balances/amounts. Each gateway will generally manage one or more accounts, each of which may be identified, for example, by the public key of its owner, or with some other identifier assigned by with the gateway itself or some higher authority.

It is preferable to be able to determine where initial account balances come from if these are not simply initialized to be zero. One way to do this is to implement a special "master" gateway, associated for example with a highest-level authority such as a central bank, central warehouse, etc., which then create "emission" POs that transfer assets into initialized accounts. Another option is to implement special keys for generating POs that are delivered straight to each recipient gateway and perform immediate crediting of accounts.

Any conventional method may be used to implement the application program interface (API) 300 between a recipient and its output component, which may provide such functions to the recipient as computing the current balance in the recipient's account, providing transfer confirmation to sender (or recipient given he has presented a corresponding reference), providing an account statement to the owner, etc.

Permissionless Embodiment

The embodiments described above provide a "permissioned" system, in which the central emitting entity ultimately controls not only emission of data units, but also forms the ultimate trust anchor of the system in that its public key is a trusted common reference string. As such, the central entity is the ultimate authority to operate gateways and issue bills, and, therefore, the ultimate authority to determine if a transfer order accepted or not. Using the permissioned embodiments, a central bank, for example, would be able to block even valid transfer requests. This is referred to as lacking "censorship resistance".

An alternative "permissionless" aspect of the invention provides censorship resistance. According to this permissionless aspect, there is no need for the input component 500 to receive transfer requests, examine the identifier of the data unit to be transferred, and then route the request to the associated responsible gateway. Instead, the transferor itself has the information about the correct routing; this information may be encoded in the data unit itself, and will as before be a function of the data unit's identifier.

Rather than "a" gateway (which may be a cooperating cluster of platforms) associated with the sub-ledger corresponding to the data unit, there is instead a group of validator "nodes", and the transferor may submit the transfer request to one, several, or all of the associated nodes, which thus operate as a "logical gateway". The node(s) that received the request then circulates it to the other nodes, which may then choose to accept or reject it. Note that nodes themselves may optionally be comprised of a cooperating network of physical platforms.

The node(s) to which the request has been sent will circulate it to the other nodes, which may then choose to accept or reject it, and each node that has accepted it includes it in a respective proposed block. Following any known consensus mechanism, the nodes then come to consensus about which block is to be created, that is, which transfer orders to include in the current round. A node may choose to reject a proposed block, for example, if the transferor's signature is invalid, or it would lead to too small of a "reward" (if included). A node that has proposed an invalid block may be "punished", for example, being denied the opportunity to propose further blocks for some time, having some reward reduced or eliminated, etc.

As for "rewards", one option would be to impose a transaction fee on transfers, which is given to nodes that successfully propose the corresponding block. A node may therefore, for example, reject a block because it views the transaction fee reward (or fees, from the accumulated transactions in the block) as being too small. In this aspect, no single party can unilaterally prevent a requested transaction.

Once the transfer request block is agreed upon, the requests may be processed according to the respective sub-ledgers and block ledgers as in the permissioned aspect. Copies of these may stored in the corresponding validator nodes; alternatively, there could still be a single gateway that maintains the respective sub-ledgers and receives the agreed-upon transfer orders from the nodes after they have reached consensus. As such, certain features of the permissioned and permissionless aspects are the same, but way in which transfer requests are input and routed is different.

The nodes may optionally operate in rounds, optionally synchronized to some time base, or defined by a minimum number of received transaction.

Transactions that have not yet been not processed/included in block may be stored in a common pool "mempool", and a proposer node may choose transactions from that mempool if they are not sent directly to that node already. According to this aspect, decentralized nodes therefore replace "the" gateway server with a cluster of fault-tolerant validator nodes performing same the logic in parallel, with each of the validator nodes checking signatures independently and voting on whether a proposed block is acceptable or not.

Note important differences between this permissionless aspect and how a typical prior art blockchain forms blocks and uses consensus: No node is required to have a copy of the entire global blockchain, but rather creates only blocks relating to respective ones of the sub-ledgers, as indicated in the transfer requests. This means there is also no need for coordination and inter-communication among all nodes. Transactions associated with different blockchain shards may thus still be processed in parallel, which maintains the far superior ability of the different aspects of this invention to scale.

The invention claimed is:

1. A method for transferring ownership of a data unit representing a portion of a set of value units in a plurality of accounts, comprising:

associating each account with a respective one of a plurality of gateways as a function of a unique identifier of each respective account;

configuring at least one sub-ledger (L1, . . . , Le) within each respective one of the plurality of gateways, each subledger comprising a data structure indicating a balance of the respective account, and configuring each sub-ledger as a blockchain having blocks, said sub-ledgers thereby forming blockchain shards containing information relating to only a subset of global accounts;

inputting a request from a transferor to transfer from a transferor account to a transferee account at least a portion of the transferor account's balance, said transfer request including an identifier ($ID_{OR}$) of the transferor, an identifier ($ID_u$) of the designated transferee account, and an indicator of an amount to be transferred, the transferor submitting the transfer request solely to the gateway in which the sub-ledger of transferor account's balance is located, communication of the transfer request thereby requiring only transferor-to-gateway communication;

verifying the identifier of the transferor;

in the corresponding sub-ledger, entering a block indicating a deduction from the transferor account an amount corresponding to the amount to be transferred;

generating a transfer check data structure indicating the amount to be transferred and transferring the check data structure to the gateway corresponding to the account of the transferee, whereby said gateway corresponding to the account of the transferee appends to the sub-ledger corresponding to the transferor account data indicating addition of the transferred amount.

2. The method of claim 1, in which the sub-ledgers (L1, . . . , Le) are stored within the respective gateways.

3. The method of claim 1, in which the transfer request comprises its respective sub-ledger, which is passed to the respective gateway along with the transfer request and is passed to the transferee upon completion of the transfer request.

4. The method of claim 1, further comprising performing the steps of claim 1 per-subledger, whereby transfer requests associated with different subledgers are processed in parallel.

5. The method of claim 1, further comprising generating cryptographic proof of each transfer request and including the cryptographic proof in the respective subledger.

6. The method of claim 1, in which:

gateways process transfer requests in rounds; and generating a cryptographic witness of at least each sub-ledger that has been changed during each round, thereby ensuring that only one instance of the subledger exists.

7. The method of claim 6, further comprising synchronizing the rounds with a time base.

8. The method of claim 7, in which the time base is an aggregation period of a hash-tree based digital signature infrastructure, said infrastructure thereby forming not only a signature but also a synchronization and timestamping mechanism.

* * * * *